United States Patent
Nakamura et al.

(10) Patent No.: US 7,631,156 B2
(45) Date of Patent: Dec. 8, 2009

(54) STORAGE SYSTEM ISSUING OPTIMUM I/O COMMAND TO ALLOCATION-ON-USE ENABLED VOLUME AND CONTROLLING METHOD THEREFOR

(75) Inventors: Takaki Nakamura, Ebina (JP); Atsushi Sutoh, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 275 days.

(21) Appl. No.: 11/434,319

(22) Filed: May 10, 2006

(65) Prior Publication Data
US 2007/0220225 A1 Sep. 20, 2007

(30) Foreign Application Priority Data
Mar. 15, 2006 (JP) ............................ 2006-071713

(51) Int. Cl.
G06F 12/00 (2006.01)
(52) U.S. Cl. ................. 711/161; 711/100; 711/114; 711/115; 711/162; 711/200; 711/202; 711/203; 714/5; 714/6; 707/204; 719/325
(58) Field of Classification Search ................. 711/100, 711/114, 115, 161–162, 200, 202–203; 714/5–6; 719/325; 707/204
See application file for complete search history.

(56) References Cited

U.S. PATENT DOCUMENTS

| | | | |
|---|---|---|---|
| 6,604,118 B2 * | 8/2003 | Kleiman et al. ............. 707/203 |
| 6,792,518 B2 | 9/2004 | Armangau et al. |
| 7,003,628 B1 * | 2/2006 | Wiedenman et al. ........ 711/118 |
| 7,035,881 B2 * | 4/2006 | Tummala et al. ............ 707/204 |
| 7,159,087 B2 * | 1/2007 | Shinozaki et al. ........... 711/162 |
| 2003/0009619 A1 | 1/2003 | Kano et al. |
| 2004/0172501 A1 * | 9/2004 | Ukai et al. .................. 711/112 |
| 2004/0186900 A1 | 9/2004 | Nakano et al. |
| 2006/0085663 A1 | 4/2006 | Sutoh |
| 2007/0113004 A1 * | 5/2007 | Sugimoto et al. ........... 711/112 |
| 2007/0156957 A1 * | 7/2007 | MacHardy et al. .......... 711/114 |

FOREIGN PATENT DOCUMENTS

| JP | 2003-015915 | 1/2003 |
|---|---|---|
| JP | 2004-342050 | 12/2004 |

* cited by examiner

Primary Examiner—Tuan V Thai
Assistant Examiner—Zhuo H Li
(74) Attorney, Agent, or Firm—Townsend and Townsend and Crew LLP

(57) ABSTRACT

To improve snapshot performance and copying performance on a block device level in a capacity of an allocation-on-use volume. Provided is a storage system coupled to a network includes one or more volumes constituted of a plurality of blocks. The plurality of blocks include a first block and a second block, and a physical storage area is allocated to at least one of the plurality of blocks. When it is judged that the physical storage area has not been allocated to the target first block of a received writing request, the storage system writes data to be written by the writing request in the first block without copying data stored in the first block to the second block.

20 Claims, 30 Drawing Sheets

|        | 0 | 1 | 2 | 3 | 4 | 5 | 6 | 7 | 8 | 9 | a | b | c | d | e | f |
|--------|---|---|---|---|---|---|---|---|---|---|---|---|---|---|---|---|
| 0x0000 | 0 | 0 | 1 | 1 | 1 | 1 | 0 | 0 | 1 | 0 | 0 | 1 | 0 | 0 | 0 | 1 |
| 0x0010 | 1 | 1 | 0 | 0 | 1 | 0 | 0 | 0 | 0 | 0 | 1 | 1 | 0 | 0 | 0 | 1 |
| 0x0020 | 0 | 0 | 0 | 0 | 0 | 1 | 1 | 1 | 1 | 1 | 1 | 0 | 1 | 1 | 0 | 0 |
| 0x0030 | 1 | 1 | 1 | 1 | 0 | 0 | 0 | 0 | 0 | 0 | 0 | 0 | 0 | 0 | 0 | 0 |
| 0x0040 | 0 | 0 | 0 | 0 | 0 | 0 | 0 | 0 | 0 | 0 | 0 | 0 | 0 | 0 | 0 | 0 |

FIG. 17

| | |
|---|---|
| COPY & WRITE COMMAND | ~2301 |
| COPY SOURCE DISK DRIVE | ~2302 |
| COPY SOURCE BLOCK ADDRESS | ~2303 |
| NUMBER OF BLOCKS TO BE COPIED | ~2304 |
| COPY DESTINATION DISK DRIVE | ~2305 |
| COPY DESTINATION BLOCK ADDRESS | ~2306 |
| WRITING DESTINATION DISK DRIVE | ~2307 |
| WRITING DESTINATION BLOCK ADDRESS | ~2308 |
| NUMBER OF BLOCKS TO BE WRITTEN | ~2309 |
| WRITE DATA HOLDING MEMOR ADDRESS | ~2310 |

*FIG. 23*

| | |
|---|---|
| COPY & WRITE COMMAND | ～ 2501 |
| COPY SOURCE DISK DRIVE | ～ 2502 |
| COPY SOURCE BLOCK ADDRESS | ～ 2503 |
| NUMBER OF BLOCKS TO BE COPIED | ～ 2504 |
| COPY DESTINATION DISK DRIVE | ～ 2505 |
| COPY DESTINATION BLOCK ADDRESS | ～ 2506 |
| WRITING DESTINATION DISK DRIVE | ～ 2507 |
| WRITING DESTINATION BLOCK ADDRESS | ～ 2508 |
| NUMBER OF BLOCKS TO BE WRITTEN | ～ 2509 |
| WRITE FIRST DATA HOLDING MEMORY ADDRESS | ～ 2510 |
| WRITE SECOND DATA HOLDING MEMORY ADDRESS | ～ 2511 |

*FIG. 25*

| | |
|---|---|
| COPY & WRITE & WRITE COMMAND | 2701 |
| COPY SOURCE DISK DRIVE | 2702 |
| COPY SOURCE BLOCK ADDRESS | 2703 |
| NUMBER OF BLOCKS TO BE COPIED | 2704 |
| COPY DESTINATION DISK DRIVE | 2705 |
| COPY DESTINATION BLOCK ADDRESS | 2706 |
| FIRST WRITING DESTINATION DISK DRIVE | 2707 |
| FIRST WRITING DESTINATION BLOCK ADDRESS | 2708 |
| NUMBER OF FIRST BLOCKS TO BE WRITTEN | 2709 |
| FIRST WRITE DATA HOLDING MEMORY ADDRESS | 2710 |
| SECOND WRITING DESTINATION DISK DRIVE | 2711 |
| SECOND WRITING DESTINATION BLOCK ADDRESS | 2712 |
| NUMBER OF SECOND BLOCKS TO BE WRITTEN | 2713 |
| SECOND WRITE DATA HOLDING MEMORY ADDRESS | 2714 |

*FIG. 27*

| | |
|---|---|
| COPY & WRITE & WRITE COMMAND | 2901 |
| COPY SOURCE DISK DRIVE | 2902 |
| COPY SOURCE BLOCK ADDRESS | 2903 |
| NUMBER OF BLOCKS TO BE COPIED | 2904 |
| COPY DESTINATION DISK DRIVE | 2905 |
| COPY DESTINATION BLOCK ADDRESS | 2906 |
| FIRST WRITING DESTINATION DISK DRIVE | 2907 |
| FIRST WRITING DESTINATION BLOCK ADDRESS | 2908 |
| NUMBER OF FIRST BLOCKS TO BE WRITTEN | 2909 |
| FIRST WRITE FIRST DATA HOLDING MEMORY ADDRESS | 2910 |
| FIRST WRITE SECOND DATA HOLDING MEMORY ADDRESS | 2911 |
| SECOND WRITING DESTINATION DISK DRIVE | 2912 |
| SECOND WRITING DESTINATION BLOCK ADDRESS | 2913 |
| NUMBER OF SECOND BLOCKS TO BE WRITTEN | 2914 |
| SECOND WRITE DATA HOLDING MEMORY ADDRESS | 2915 |

*FIG. 29*

STORAGE SYSTEM ISSUING OPTIMUM I/O COMMAND TO ALLOCATION-ON-USE ENABLED VOLUME AND CONTROLLING METHOD THEREFOR

CLAIM OF PRIORITY

The present application claims priority from Japanese application JP2006-071713 filed on Mar. 15, 2006, the content of which is hereby incorporated by reference into this application.

BACKGROUND

A technology disclosed in this specification relates to a data processing technology for a storage system, and more particularly, to a technology of optimizing issuance of an I/O command when snapshot processing or copying processing is carried out in an allocation-on-use (AOU) enabled volume.

As one of basic storage functions, for example, a volume AOU technology is disclosed in JP 2003-15915 A. According to the technology of JP 2003-15915 A, in a volume pool including a plurality of virtual volumes, a physical block is not allocated to a block constituting a virtual volume when the virtual volume is created. When an actual use request (writing I/O request or the like) is issued, a physical block is allocated, from the volume pool, to a target block of the request. By using the AOU technology, a sufficiently large size of the virtual volume is allocated, and a size of the volume pool is properly set, whereby basically an administrator only needs to monitor a free capacity of the volume pool and is freed from capacity expansion work of the virtual volume.

When the size of the virtual volume is excessively large, a resource size for managing the volume itself (e.g., file system metadata and snapshot management table) is increased by a corresponding amount. As a result, there arise problems such as a performance reduction caused by consumption of usable area in a memory by holding management data therein, and consumption of usable disk capacity by using the disk capacity for storing the management data.

A snapshot function is disclosed as another basic storage function. There are two systems for realizing the snapshot function, i.e., an entire snapshot system for copying entire volumes, and a differential snapshot system (e.g., refer to JP 2004-342050 A) for separately storing differential information alone and creating a snapshot image from differential data and primary volume data. The differential snapshot system can be further classified into two systems. In other words, there are an allocation-on-write system for writing write data of a primary volume in an unallocated area and rewrite a primary volume mapping table, and a copy-on-write (hereinafter referred to as "COW") system for copying (saving) data originally held in a write request block in another area at the time of writing in the primary volume, and then executing requested write processing. The COW system is disclosed in JP 2004-342050. Reading performance of the COW system for a volume in which a differential snapshot is executed is equal to that of a volume having no snapshot. However, as writing performance of the former in the volume is lower than that of the latter in the volume because of copying processing for the COW. A conventional art to mitigate such a performance reduction is disclosed in, e.g., U.S. Pat. No. 6,792,518.

According to the technology of U.S. Pat. No. 6,792,518, free areas of a file system for the primary volume and past snapshots are extracted and, when COW occurs in their overlapped (AND) free area, the COW is made invalid.

SUMMARY

When the differential snapshot of the COW system of JP 2004-342050 A is applied to the volume to which the AOU technology of JP 2003-15915 A is applied, a writing request may be made for a block having no physical block allocated thereto (i.e., block in which no data is stored). However, when the technology of JP 2004-342050 A is directly applied, data saving is executed in the block having no physical block allocated thereto, to thereby reduce writing performance.

According to U.S. Pat. No. 6,792,518, a free area of each generation must be extracted, so there arises a problem in that resources for management are increased. According to the method of U.S. Pat. No. 6,792,518, a host application (file system or the like) must manage the free area. Thus, the method must be executed for each application.

This invention therefore has an object to solve the foregoing problems in order to achieve a high speed of snapshot processing and copying processing.

According to a representative aspect of this invention, there is provided a storage system coupled to a network characterized by including: an interface coupled to the network; a processor coupled to the interface; a first memory coupled to the processor; a disk drive for storing data; and one or more volumes, and characterized in that: the one or more volumes include a plurality of blocks; the plurality of blocks include a first block and a second block; a physical storage area is allocated to at least one of the plurality of blocks; the processor judges whether the physical storage area has been allocated or not to the first block when the interface receives a data writing request targeting the first block through the network; the processor copies data stored in the first block to the second block, and then writes data to be written by the writing request in the first block when the physical storage area is judged to have been allocated; and the processor writes the data to be written by the writing request in the first block without copying the data stored in the first block to the second block when the physical storage area is judged not to have been allocated.

According to an embodiment of this invention, it is possible to achieve a high speed of differential snapshot processing or copying processing on the block device level without consuming a large volume of resources. Moreover, it is possible to reduce a capacity of the differential volume or the copying destination volume.

BRIEF DESCRIPTION OF THE DRAWINGS

FIG. 17 is an explanatory diagram of a file system free block bitmap according to the third embodiment of this invention.

FIG. 23 is an explanatory diagram showing an example of a format of a COPY & WRITE command issued by targeting an AOU disabled virtual volume according to the fifth embodiment of this invention.

FIG. 25 is an explanatory diagram showing an example of a format of a COPY & WRITE command issued by targeting an AOU enabled virtual volume according to the fifth embodiment of this invention.

FIG. 27 is an explanatory diagram showing an example of a format of a COPY & WRITE & WRITE command issued by targeting the AOU disabled virtual volume according to the fifth embodiment of this invention.

FIG. 29 is an explanatory diagram showing an example of a format of the COPY & WRITE & WRITE command issued by targeting the AOU enabled virtual volume according to the fifth embodiment of this invention.

DETAILED DESCRIPTION OF THE PREFERRED EMBODIMENTS

Hereinafter, preferred embodiments of this invention will be described with reference to the drawings. First and second embodiments relate to a case where a snapshot function is located outside a storage processing module (i.e., a microprogram of a storage device), for example, a case where this invention is applied to an external NAS or a built-in NAS. A third embodiment relates to new area allocation of an application in configurations of the first and second embodiments. A fourth embodiment relates to a case where a snapshot function is in a storage processing module. A fifth embodiment relates to a case where a microprogram for processing an I/O command is improved.

First, a configuration of a conventional storage system will be described.

Figure 5:
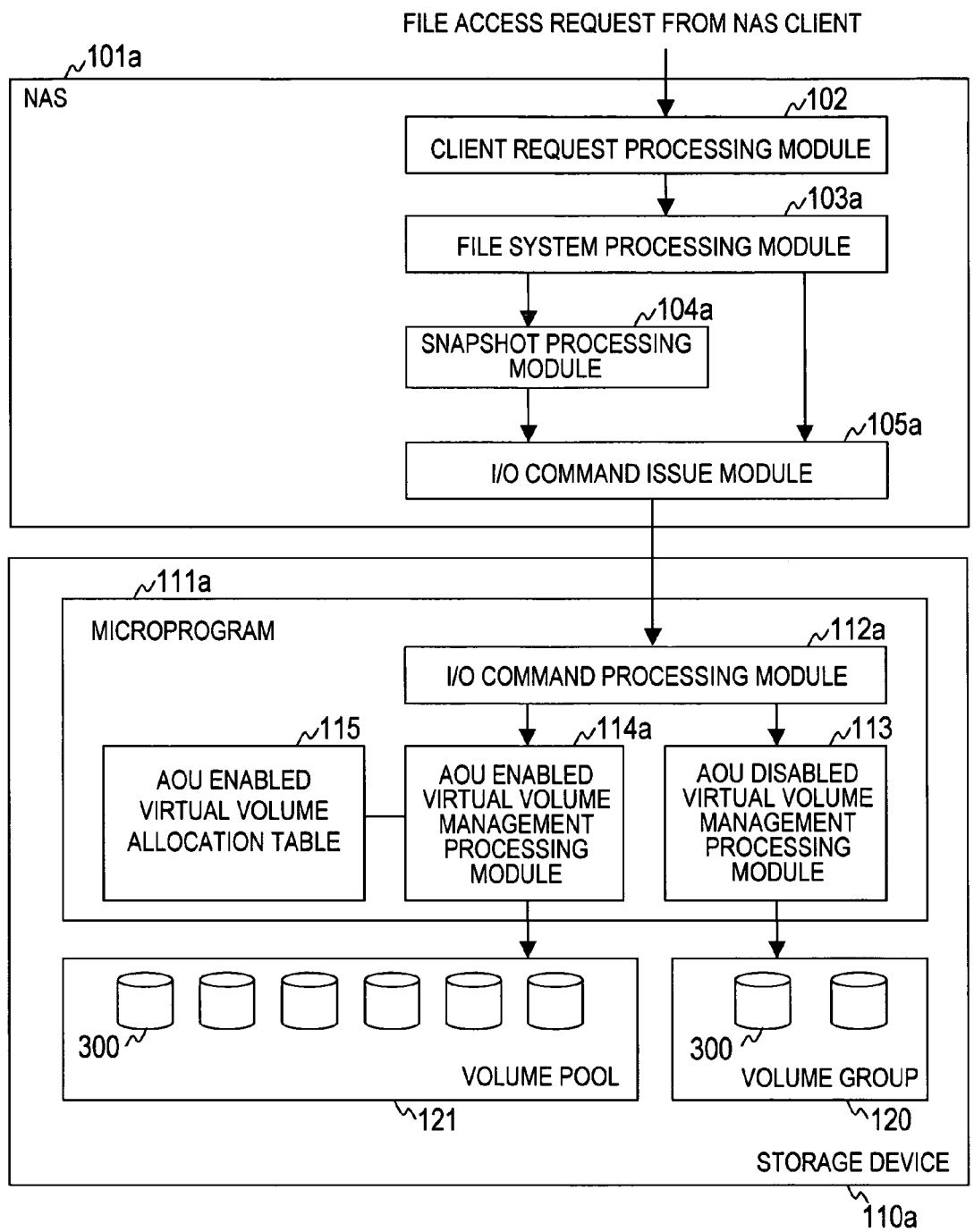
FIG. 5 is a functional block diagram showing a conventional configuration of a network attached storage (NAS) system for providing a snapshot function by using an AOU enabled virtual volume.

FIG. 5 is a functional block diagram showing a conventional configuration of a network attached storage (NAS) system for providing a snapshot function by using an AOU enabled virtual volume.

When a NAS client (not shown) which is a computer connected to a network issues a file access request targeting a certain file, a client request processing module 102 of a NAS 101a receives the file access request. The client request processing module 102 issues a local file access request to a file system processing module 103a. The file system processing module 103a issues an I/O request to a block having data or metadata of a target file stored therein. In this case, the block I/O request is issued to a snapshot processing module 104a when a file system is subjected to snapshot operation, or to an I/O command issue module 105a when it is not subjected to snapshot operation.

This block I/O request is processed by an I/O command processing module 112a of a microprogram 111a in the storage device 110a. The I/O command processing module 112a transfers processing to an AOU disabled virtual volume management processing module 113 when the received block I/O request is a request to an AOU disabled virtual volume. The AOU disabled virtual volume is a volume in which physical blocks (i.e., physical storage areas) are prepared in all areas of the volume when the volume is created.

The AOU disabled virtual volume management processing module 113 executes block I/O by targeting one of volumes 300 of a volume group 120.

When the block I/O request received by the I/O command processing module 112a is a request to an AOU enabled virtual volume, the process transfers to an AOU enabled virtual volume management processing module 114a. The AOU enabled virtual volume is a volume in which a physical block has been allocated only to a used area of the volume.

The AOU enabled virtual volume management processing module 114a refers to an AOU enabled virtual volume allocation table 115 to judge whether the received request is a block I/O request to an area having a physical block allocated thereto or not.

The AOU enabled virtual volume allocation table 115 contains information on a correlation between each area (block) included in the AOU enabled virtual volume and a physical block. Specifically, the AOU enabled virtual volume allocation table 115 contains at least information for identifying a physical block allocated to each area (block) included in the AOU enabled virtual volume. The information for identifying the physical block is, for example, a block address. By referring to the AOU enabled virtual volume allocation table 115, it is possible to know whether a physical block has been allocated or not to each area of the AOU enabled virtual volume, and which of the physical blocks has been allocated if the physical block has been allocated.

If the received request is a block I/O request to an area to which the physical block has been allocated, the AOU enabled virtual volume management processing module 114*a* executes block I/O for a physical block of the volume 300 in a volume pool 121 indicated by the AOU enabled virtual volume allocation table 115.

On the other hand, if the received request is a block I/O request to an area to which no physical block has been allocated, the AOU enabled virtual volume management processing module 114*a* allocates an unused physical block of the volume 300 of the volume pool 121 to a target area of the I/O request. Then, the AOU enabled virtual volume management processing module 114*a* updates the AOU enabled virtual volume allocation table 115 to execute block I/O for the allocated physical block.

Next, the embodiments of this invention will be described.

Figure 1:
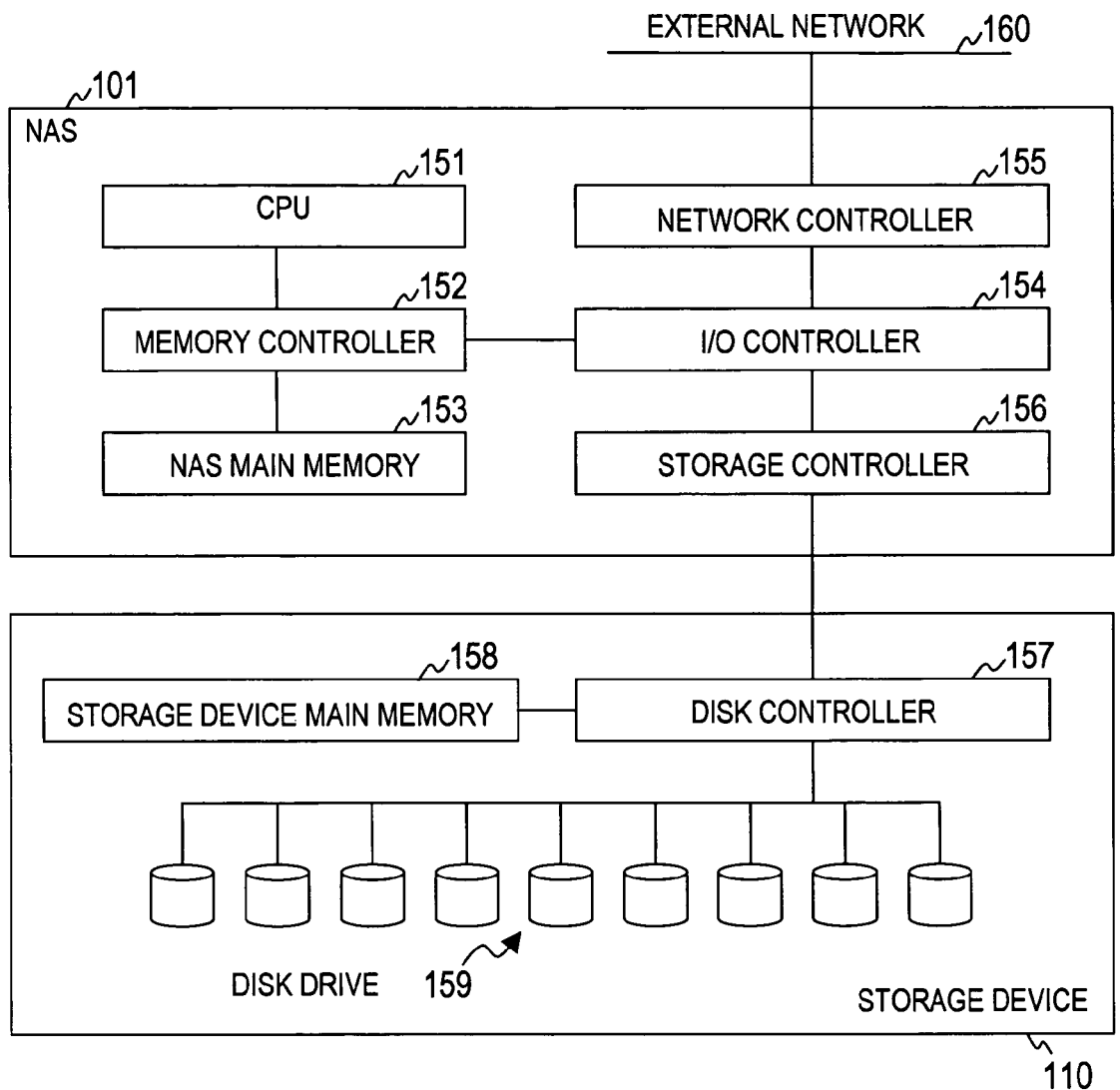
FIG. 1 is a block diagram showing a hardware configuration of a storage system according to a first embodiment of this invention.

FIG. 1 is a block diagram showing a hardware configuration of a storage system according to the first embodiment of this invention.

The storage system shown in FIG. 1 includes a network attached storage (NAS) 101 and a storage device 110 connected to each other.

The NAS 101 is a computer connected to an external network 160 to provide storage data to a client computer (i.e., NAS client) connected to the external network 160. The NAS 101 includes a CPU 151, a memory controller 152, a NAS main memory 153, an I/O controller 154, a network controller 155, and a storage controller 156 connected to one another. The NAS 101 is also called a NAS head or a NAS node. As described below, the NAS 101 may be incorporated as a part of a controller in the storage device 110 (refer to FIG. 11).

The memory controller 152 is connected to the CPU 151, the NAS main memory 153, and the I/O controller 154.

The CPU 151 is a processor for executing a program stored in the NAS main memory 153.

The NAS main memory 153 is, for example, a semiconductor memory device for storing the program executed by the CPU 151 and information referred to when the program is executed.

The I/O controller 154 is connected to a network controller 155 and a storage controller 156.

The network controller 155 is an interface connected to the external network 160 to communicate with the client computer. The external network 160 is, for example, a local area network (LAN), but other types of networks may be used.

The storage controller 156 is an interface connected to a disk controller 157 in the storage device 110 through a fiber channel or the like to communicate with the disk controller.

The storage device 110 includes the disk controller 157, a storage device main memory 158, and one or more disk drives 159.

The disk controller 157 connects the storage device main memory 158 to one or more disk drives 159. The disk controller 157 is a processor for executing a program stored in the storage device main memory 158 to process an I/O command of data (i.e., write command or read command) for the disk drive 159. The disk controller 157 may include an interface for communicating with the storage controller 156.

The storage device main memory 158 is, for example, a semiconductor memory for storing the program executed by the disk controller 157 and information referred to when the program is executed.

Figure 2:
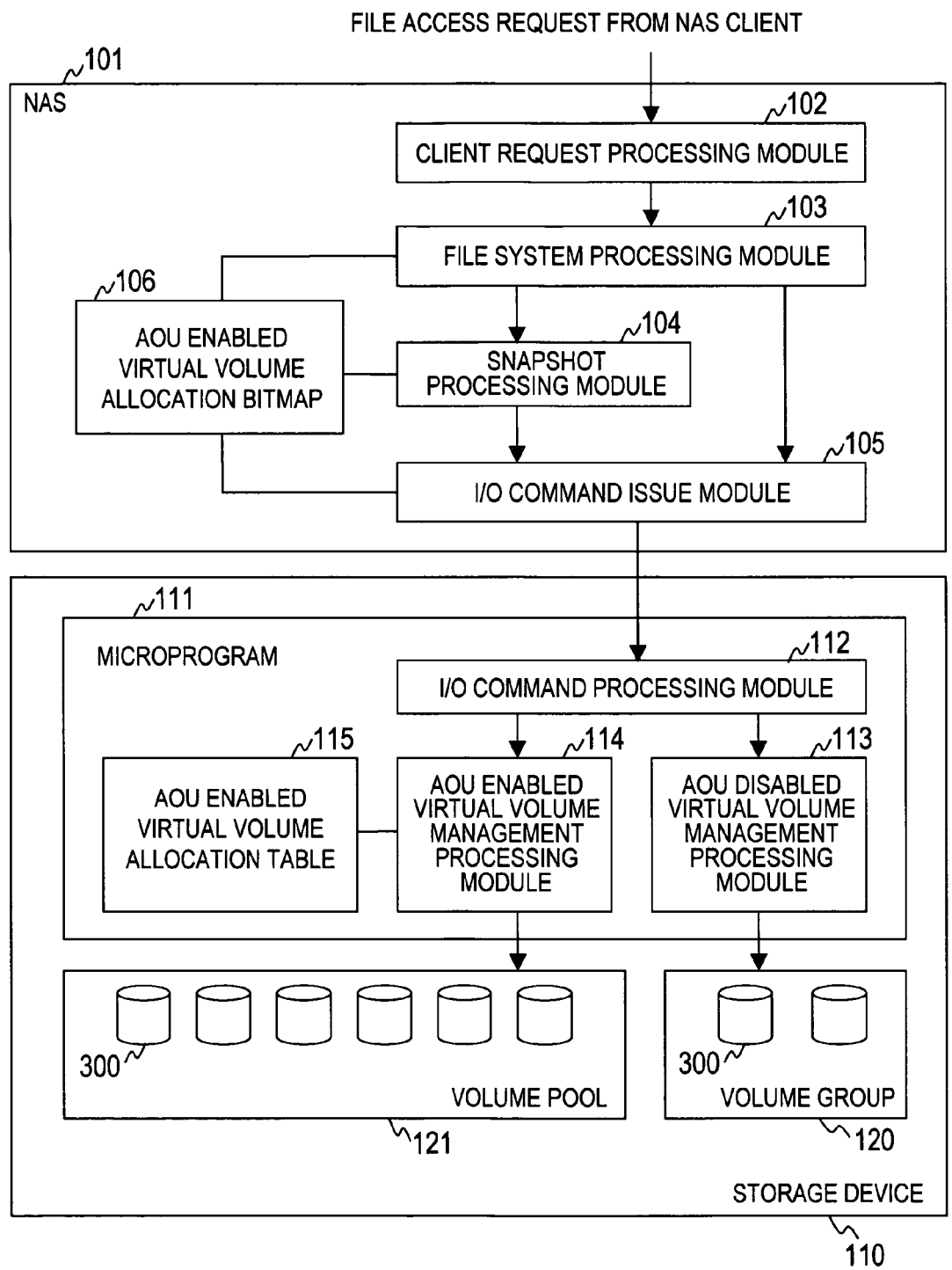
FIG. 2 is a functional block diagram of the storage system according to the first embodiment of this invention.

FIG. 2 is a functional block diagram of the storage system according to the first embodiment of this invention.

The NAS 101 of the embodiment holds a client request processing module 102, a file system processing module 103, a snapshot processing module 104, and an I/O command issue module 105. These are programs to be executed by the CPU 151 and stored in the NAS main memory 153. An AOU enabled virtual volume allocation bitmap 106 is stored as data of the NAS 101 in the NAS main memory 153.

On the other hand, a microprogram 111 is a program to be executed by the disk controller 157 and stored in the storage device main memory 158.

Among the components shown in FIG. 2, the file system processing module 103, the snapshot processing module 104, the I/O command issue module 105, the AOU enabled virtual volume allocation bitmap 106, the I/O command processing module 112, and the AOU enabled virtual volume management processing module 114 are different from the conventional functional components shown in FIG. 5. Among the components shown in FIG. 2, description of those described above referring to FIG. 5 will be omitted.

The microprogram 111 shown in FIG. 2 includes an I/O command processing module 112, an AOU disabled virtual volume management processing module 113, and an AOU enabled virtual volume management processing module 114. These are subprograms of the microprogram 111. The microprogram 111 further includes an AOU enabled virtual volume allocation table 115.

The storage device 110 of FIG. 2 further includes a volume group 120 and a volume pool 121. One or more volumes 300 are set in each of the volume group 120 and the volume pool 121. Each volume 300 is a virtual storage area recognized as one device by the NAS 101.

Each volume 300 is constituted of one or more blocks (not shown). The block is a storage area for storing a predetermined amount of data. Physical storage areas are allocated to all the blocks constituting the volume of the volume group 120. The physical storage area is a physical storage area (i.e., physical block) of the disk drive 159. Data stored in each block is actually stored in the physical block allocated to the block.

Figure 3:
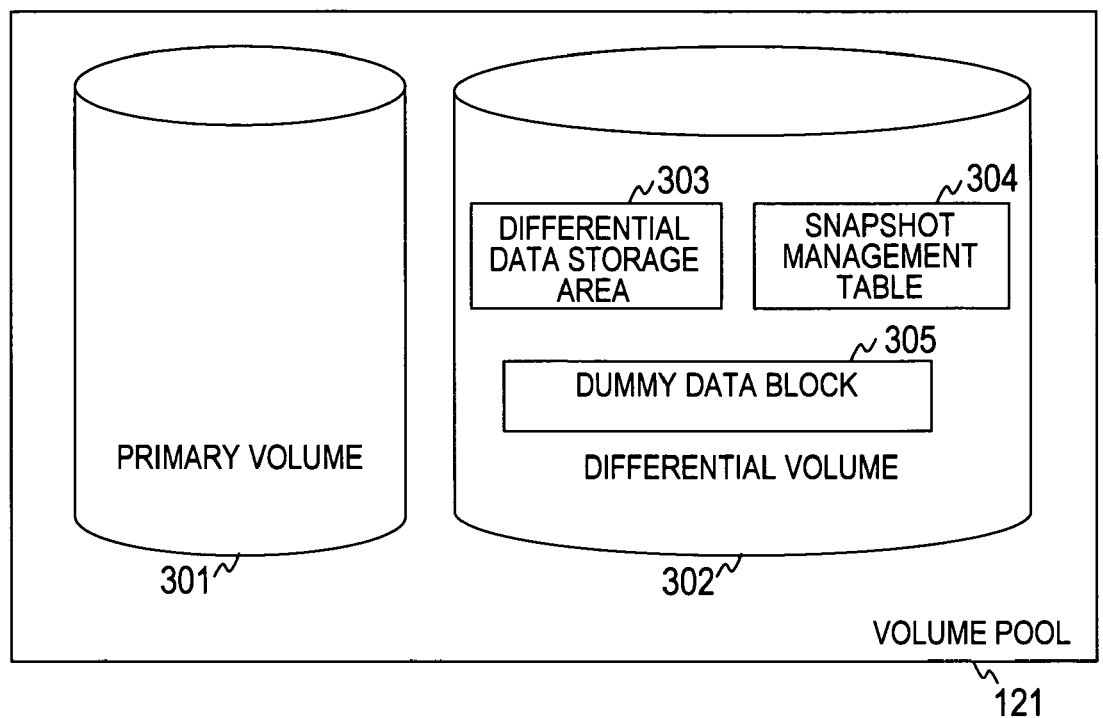
FIG. 3 is an explanatory diagram of a configuration of a volume pool according to the first embodiment of this invention.

FIG. 3 is an explanatory diagram of a configuration of the volume pool 121 according to the first embodiment of this invention.

At least one of the volumes 300 in the volume pool 121 is a primary volume 301, and at least another of the volumes 300 is a differential volume 302. FIG. 3 shows one primary volume 301 and one differential volume 302 as an example. However, the volume pool 121 of the embodiment may include a plurality of primary volumes 301 and a plurality of differential volumes 302.

Target data of a writing request issued from the NAS client via the external network 160 is stored in a block constituting the primary volume 301.

The differential volume 302 includes a differential data storage area 303, a snapshot management table 304, and a dummy data block 305. Data stored in the primary volume 301 in the past is stored in the differential data storage area 303. To be specific, when data of a block of the primary volume 301 having data stored therein is updated, the data stored in the block is stored in a block of the differential data storage area 303 before the updating. As a result, latest data is stored in the primary volume 301, and the data stored in the primary volume 301 in the past is stored in the differential volume 302.

The snapshot management table 304 is a table for managing a correlation between the block of the primary volume and the block of the differential data storage area 303. To be specific, in the snapshot management table 304, information indicating which block of the differential data storage area 303 the data stored in the primary volume 301 in the past is currently stored in is registered for each snapshot generation or each time of creating a snapshot.

The data stored in the block of the primary volume 301 is actually stored in a physical block allocated to the block. However, the primary volume 301 may include a block to which no physical block is allocated. When a data writing request targeting the block to which no physical block is allocated is issued, a free physical block is newly allocated to the target block, and data is stored in the physical block. The free physical block is a physical block to which no block has been allocated.

Thus, a volume which includes the block to which no physical block is allocated, and enables allocation of a physical block to such a block as occasion demands is referred to as an AOU enabled virtual volume. On the other hand, a volume in which physical blocks are allocated to all the blocks, and which disables allocation of physical blocks as occasion demands is referred to as an AOU disabled virtual volume. According to the embodiment, the volume 300 of the volume group 120 is an AOU disabled virtual volume. The primary volume 301 and the differential volume 302 of the volume pool 121 are AOU enabled virtual volumes.

The dummy block 305 is, for example, a block initialized by data of "0" or the like. As described below, the dummy block 305 is used as dummy copying source when copy processing is made invalid. According to this invention, the dummy data block 305 is added, and the conventional differential volume 302 does not include a dummy data block 305.

Next, an outline of the embodiment will be described.

Figure 4:
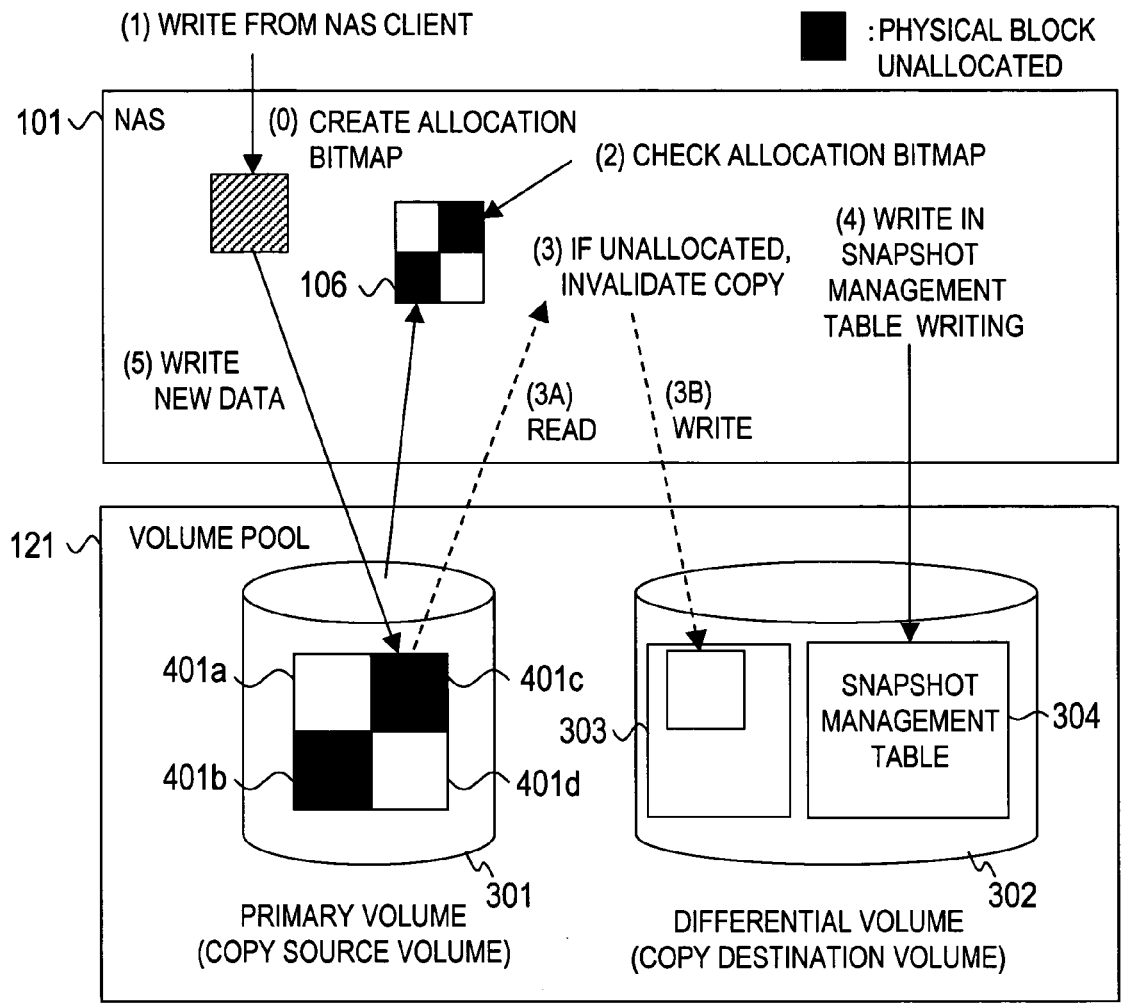
FIG. 4 is an explanatory diagram of an outline of processing executed according to the first embodiment of this invention.

FIG. 4 is an explanatory diagram of an outline of a process executed according to the first embodiment of this invention.

In an example of FIG. 4, the primary volume 301 includes four blocks 401a to 401d. No physical blocks are allocated to the black square blocks 401b and 401c. On the other hand, physical blocks are allocated to the white square blocks 401a and 401d. Information for identifying the physical blocks allocated to the blocks 401a and 401d is registered in the AOU enabled virtual volume allocation table 115.

The NAS 101 first reads the AOU enabled virtual volume allocation table 115, and extracts information indicating whether a physical block has been allocated to each block to create an AOU enabled virtual volume allocation bitmap 106 (step (0)).

Subsequently, the NAS 101 receives a data writing request from the NAS client via the network 106 (step (1)). According to the embodiment, the request received in the step (1) is a file access request.

Next, the NAS 101 refers to the AOU enabled virtual volume allocation bitmap 106 to judge whether a physical block has been allocated or not to a block of the primary volume 301 in which data of a request target file is written (step (2)). In the description below of FIG. 4, data to be written in the primary volume 301 will be referred to as new data, and data overwritten with the new data (i.e., data written in a block in which the new data is written) will be referred to as old data.

For example, when a new data writing target block is a block 401a, a physical block has been allocated. In this case, old data that has been written in the block 401a is copied to the differential data storage area 303 of the differential volume 302. To be specific, the NAS 101 reads the old data written in the block 401a (step (3A)), and writes the old data in one of the blocks of the differential data storage area 303 (step 3(B)). As a result, a copy of the old data written in the block 401a is stored in the differential data storage area 303 at this point of time. Further, the NAS 101 writes information for identifying a writing destination block in the snapshot management table 304 (step (4)). The information for identifying the block is, for example, a logical block address (LBA). Hereinafter, the information for identifying the block will be referred to as a "block address".

On the other hand, for example, when a new data writing target block is a block 401c, no physical block has been allocated. In this case, since there is no old data stored in the block 401c, it is not necessary to copy old data from the block 401c to the differential data storage area 303. Thus, the NAS 101 makes copying invalid (i.e., copying is not executed) (step (3)).

When copying is made invalid, no old data is written in the differential data storage area 303. Accordingly, in the step (4), information for identifying a writing destination block cannot be written in the snapshot management table 304. In this case, the NAS 101 of the embodiment writes information for identifying the dummy data block 305 in the snapshot management table 304. The information for identifying the dummy block 305 is, for example, a block address indicating a position of the dummy data block 305 in the differential volume 302.

After an end of the step (4), the NAS 101 writes new data in a writing target block (e.g., block 401a or block 401c) of the primary volume 301 (step (5)).

Note that the above process of copying the data stored in the writing request target block to the differential volume 302 when writing occurs in the primary volume, and then executing the requested writing is called copy on write (COW).

Conventionally, even when there is no physical block allocated to the new data writing target block, copying of data from the primary volume 301 to the differential volume 302 has been executed. According to the embodiment of this invention, however, when there is no physical block allocated to the new data writing target block, the copying process is made invalid. As a result, an unnecessary copying process is omitted to achieve a high speed of the process.

FIG. 4 shows an example where the primary volume 301 and the differential volume 302 are independent of each other. However, the primary volume 301 and the differential volume 302 may be one and the same volume. To be specific, for example, the primary volume 301 may include a differential data storage area 303 and a snapshot management table 304. In this case, a COW process is executed in the primary volume 301.

FIG. 4 shows a procedure of making copying invalid from the primary volume 301 to the differential volume 302 in the COW process. However, the embodiment can be widely applied because a copying process executed between the volumes 300 is omitted irrespective of types of volumes 300.

For example, a case where the COW process is not executed in FIG. 4, and the primary volume 301 and the differential volume 302 are both normal volumes will be described.

Upon reception of a copying request for copying data written in the block 401a of the source volume 301 to the destination volume 302, the NAS 101 judges whether a physical block has been allocated or not to the block 401a (step (2)).

As there is a physical block allocated to the block 401a, the NAS 101 copies the data written in the block 401a to the destination volume 302 (steps (3A) and (3B)).

On the other hand, when the received copying request is a request for copying data written in the block 401c to the destination volume 302, the NAS 101 judges whether a physical block has been allocated or not to the block 401c (step (2)).

As there is no physical block allocated to the block 401c, the NAS 101 does not copy the data written in the block 401c to the destination volume 302 (step (3)), and returns non-execution of copying as a response to the request source.

The process of the steps (1) to (5) can be carried out when the source volume 301 and the destination volume 302 are one and the same volume (in other words, when data is copied between two blocks of the same volume 300).

Figure 6:
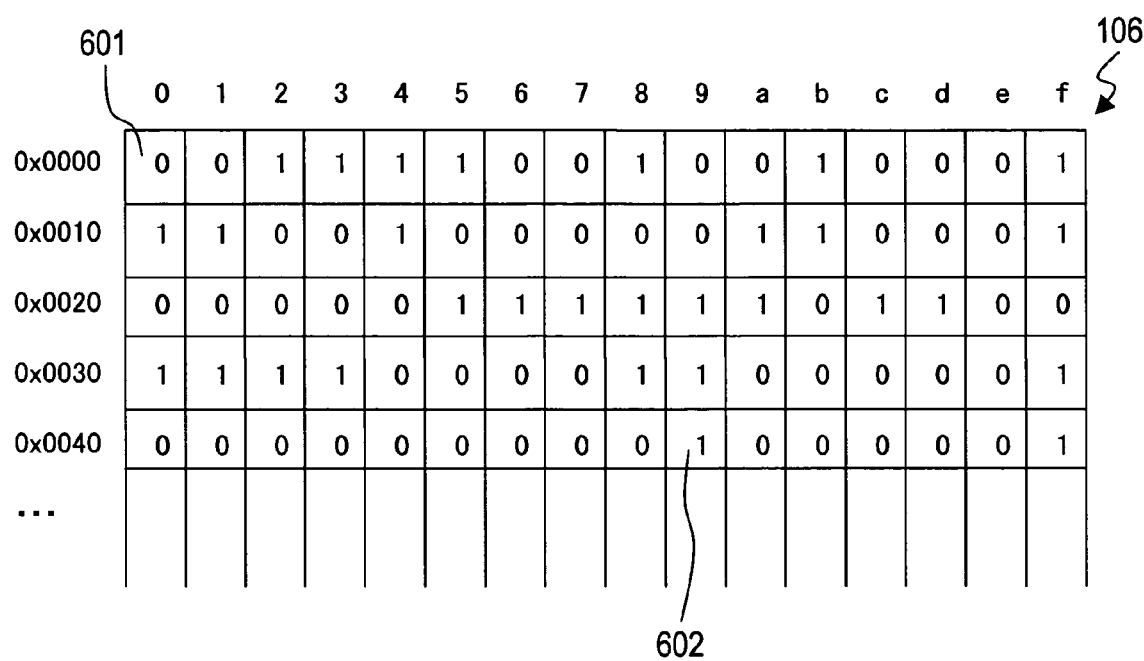
FIG. 6 is an explanatory diagram of an AOU enabled virtual volume allocation bitmap according to the first embodiment of this invention.

FIG. 6 is an explanatory diagram of the AOU enabled virtual volume allocation bitmap 106 according to the first embodiment of this invention.

The AOU enabled virtual volume allocation bitmap 106 includes an area for storing a bit value of "0" or "1" for each block address. FIG. 6 shows areas corresponding to blocks at block addresses "0x0000" to "00x004f" as an example. However, a real AOU enabled virtual volume allocation bitmap 106 includes bits corresponding to all the blocks up to a last block of the volume. The AOU enabled virtual volume allocation bitmap 106 is created for each volume to be held in the NAS main memory 153.

A first line of FIG. 6 corresponds to blocks at block addresses "0x0000" to "0x000f", and a second line corresponds to blocks at block addresses "0x0010" to "0x001f". Areas of a third line and after correspond to blocks according to a similar rule. A case where a stored value is "0" indicates unallocation of a physical block to a block corresponding to the area. On the other hand, a case where a stored value is "1" indicates allocation of a physical block corresponding to the area. In the example of FIG. 6, "0" is stored in an area 601 corresponding to the block address "0x0000", and "1" is stored in an area 602 corresponding to the block address "0x0049". This means that there is no physical block allocated to the block at the block address "0x0000" and there is a physical block allocated to the block at the block address "0x0049".

Next, a process executed by each program of the embodiment will be described.

Figure 7:
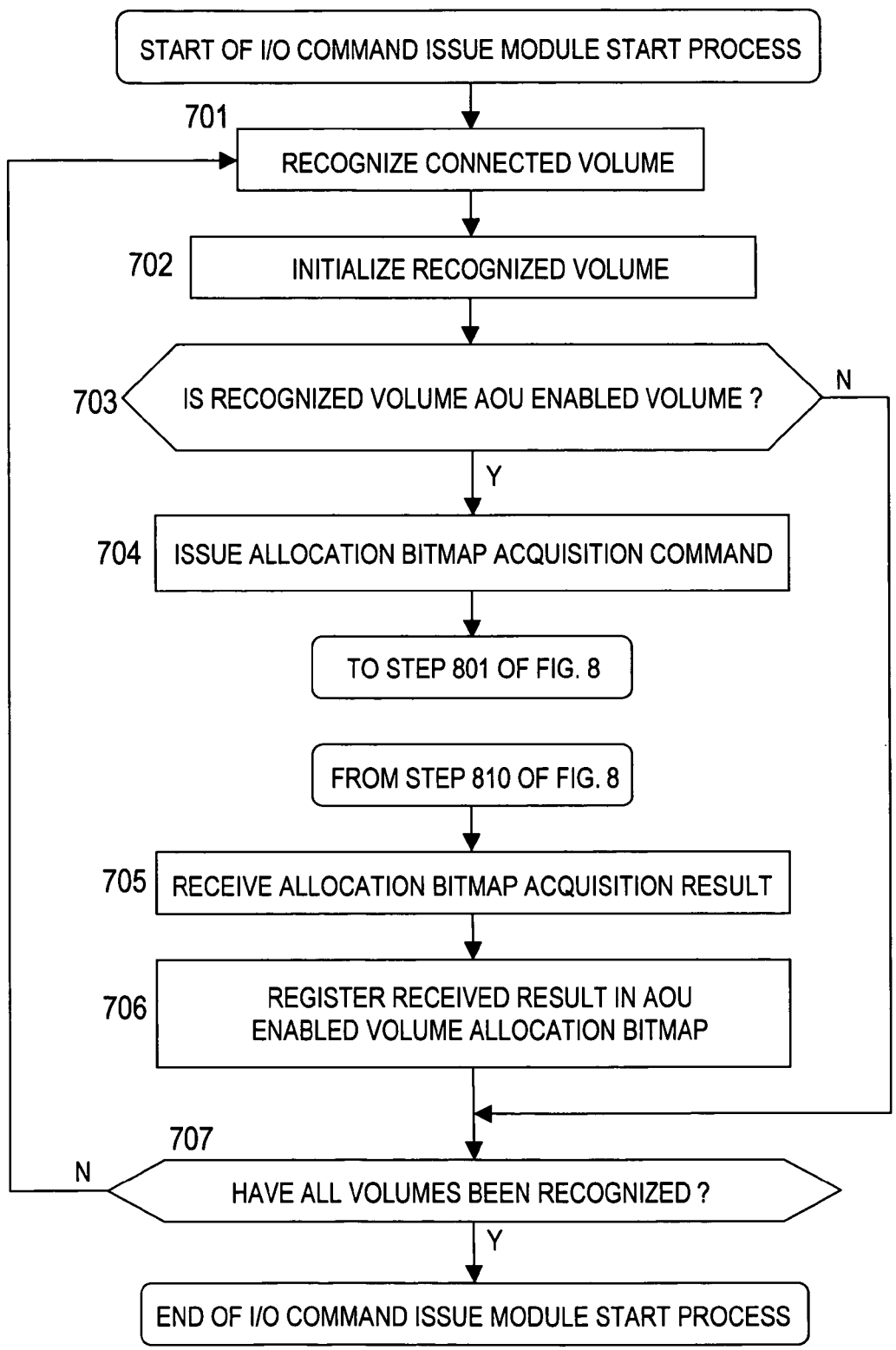
FIG. 7 is a flowchart showing a process executed by an I/O command issue module when the storage system is started according to the first embodiment of this invention.

FIG. 7 is a flowchart showing a process executed by the I/O command issue module 105 when the storage system is started according to the first embodiment of this invention.

Note that, according to the embodiment, the I/O command issue module 105 executes this process. However, a similar process may be executed by the snapshot processing module 106 or the file system processing module 103.

As described above referring to FIG. 2, the I/O command issue module 105 is a program stored in the NAS main memory 153 and executed by the CPU 151. Accordingly, the process executed by the I/O command issue module 105 will be actually executed by the CPU 151 as described below. Similarly, processes executed by other programs stored in the NAS main memory 153 will be actually executed by the CPU 151.

First, the I/O command issue module 105 recognizes a connected volume (step 701). For example, when the NAS 101 and the storage device 110 are connected to each other through SCSI, a volume corresponding to each SCSI_ID is recognized.

Then, the I/O command issue module 105 initializes the recognized volume (step 702). This is similar to initialization or the like of a conventional SCSI driver. According to the embodiment, further, as the initialization process of the volume, steps 703 to 706 are executed in addition to the step 702.

Next, the I/O command issue module 105 judges a type of the recognized volume (step 703). To be specific, the I/O command issue module 105 judges whether the recognized volume is an AOU enabled virtual volume or an AOU disabled virtual volume.

If the volume is judged to be an AOU disabled virtual volume in the step 703, the process proceeds to a step 707. On the other hand, if the volume is judged to be an AOU enabled virtual volume, the I/O command issue module 105 issues an allocation bitmap acquisition command targeting the recognized volume (step 704). For example, this command may be executed by expanding the SCSI command.

Figure 8:
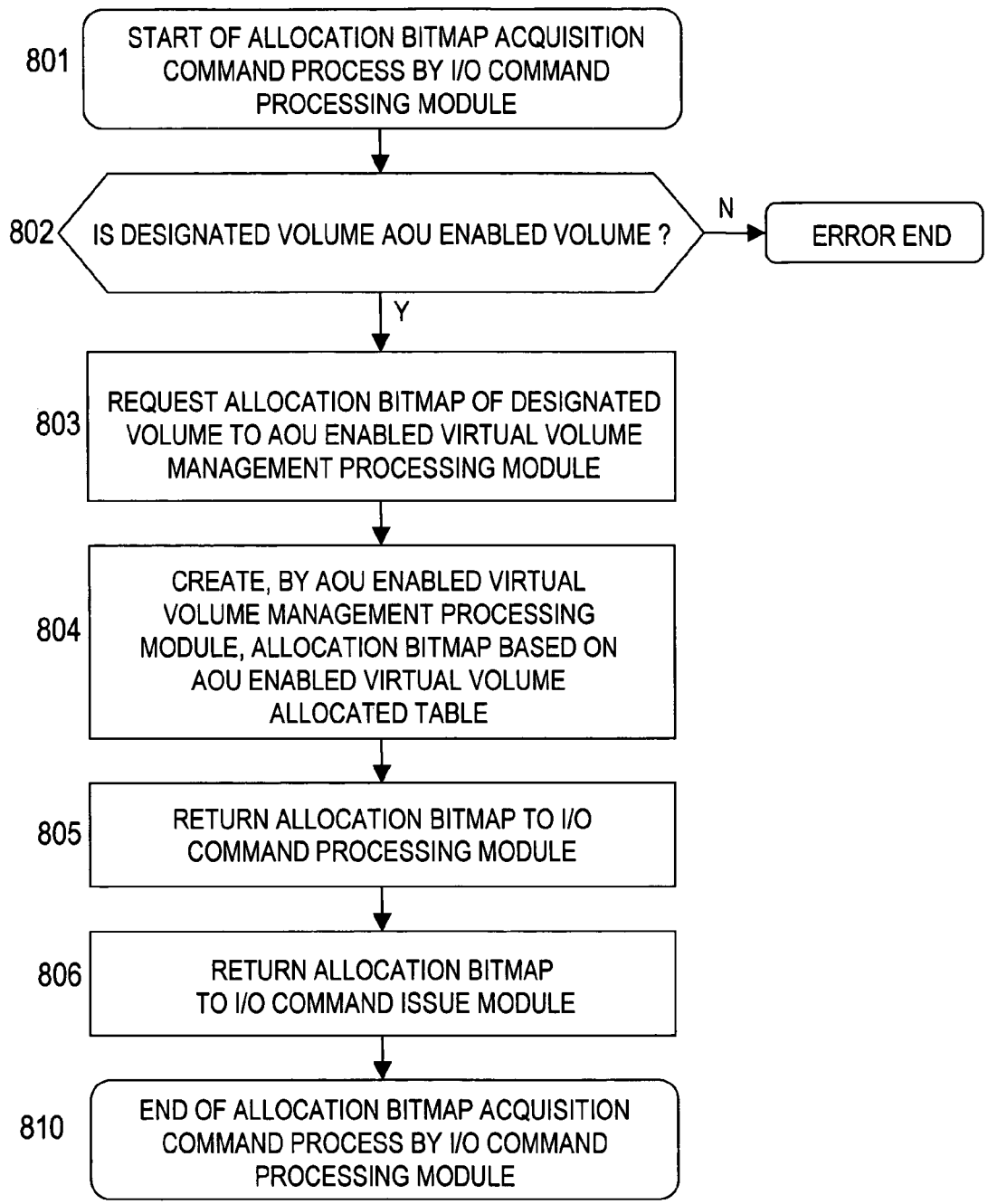
FIG. 8 is a flowchart showing an allocation bitmap acquisition command process executed by an I/O command processing module when the allocation bitmap acquisition command is received according to the first embodiment of this invention.

Subsequently, the I/O command processing module 112 of the microprogram 111 in the storage device 110 is executed. Upon reception of the allocation bitmap acquisition command, the I/O command processing module 112 starts an allocation bitmap acquisition command process (step 801 of FIG. 8) to return a target volume allocation bitmap as a response. Referring to FIG. 8, this process will be described in detail.

Upon finishing the allocation bitmap acquisition command process (step 810 of FIG. 8), the I/O command issue module 105 obtains an allocation bitmap from the I/O command processing module 112 (step 705).

Next, the I/O command issue module 105 registers the obtained allocation bitmap in the AOU enabled virtual volume allocation bitmap 106 (step 706). Thus, the initialization process for the currently recognized volume is completed.

Then, the I/O command issue module 105 checks on whether there are other recognizable volumes or not (step 707). If there is a recognizable volume, a volume that has not been initialized is present. In this case, the process returns to the step 701, and the steps 701 to 706 are repeated. If there are no other recognizable volumes, initialization has been finished for all the recognizable volumes, and thus the I/O command issue module 105 finishes the start process.

FIG. 8 is a flowchart showing an allocation bitmap acquisition command process executed when the I/O command processing module 112 receives an allocation bitmap acquisition command according to the first embodiment of this invention.

As described above referring to FIG. 2, the I/O command processing module 112 is a subprogram of the microprogram 111 stored in the storage device main memory 158 and executed by the disk controller 157. Accordingly, the process executed by the I/O command processing module 112 will be actually executed by the disk controller 157 as described below. Similarly, processes executed by other programs included in the microprogram 111 will be actually executed by the disk controller 157.

Upon reception of the allocation bitmap acquisition command, the I/O command processing module 112 starts the allocation bitmap acquisition command process (step 801).

First, the I/O command processing module 112 judges whether a target volume of the received command is an AOU enabled virtual volume or not (step 802).

If the target volume is judged to be an AOU disabled virtual volume in the step 802, the process is finished as an error.

On the other hand, if the target volume is judged to be an AOU enabled virtual volume in the step 802, the I/O command processing module 112 requests an allocation bitmap of the target volume to the AOU enabled virtual volume management processing module 114 (step 803).

The AOU enabled virtual volume management processing module 114 creates an allocation bitmap based on the AOU enabled virtual volume allocated table 115 (step 804). The AOU enabled virtual volume allocation table 115 is a mapping table including information for correlating each block of the AOU enabled virtual volume with a physical block allocated thereto. The AOU enabled virtual volume management processing module 114 refers to the AOU enabled virtual volume allocation table 115 to investigate whether a physical block has been allocated or not to each block, and creates an allocation bitmap based on the result. If there is an allocation bitmap stored beforehand in the AOU enabled virtual volume allocation table 115, the AOU enabled virtual volume management processing module 114 reads the allocation bitmap.

Next, the AOU enabled virtual volume management processing module 114 returns the created allocation bitmap to the I/O command processing module 112 as a response (step 805).

The I/O command processing module 112 returns the obtained allocation bitmap to the I/O command issue module 105 (step 806).

Thus, the allocation bitmap acquisition command process is finished (step 810).

The initialization process of the first embodiment of this invention has been described. Next, a snapshot process will be described.

Figure 9:
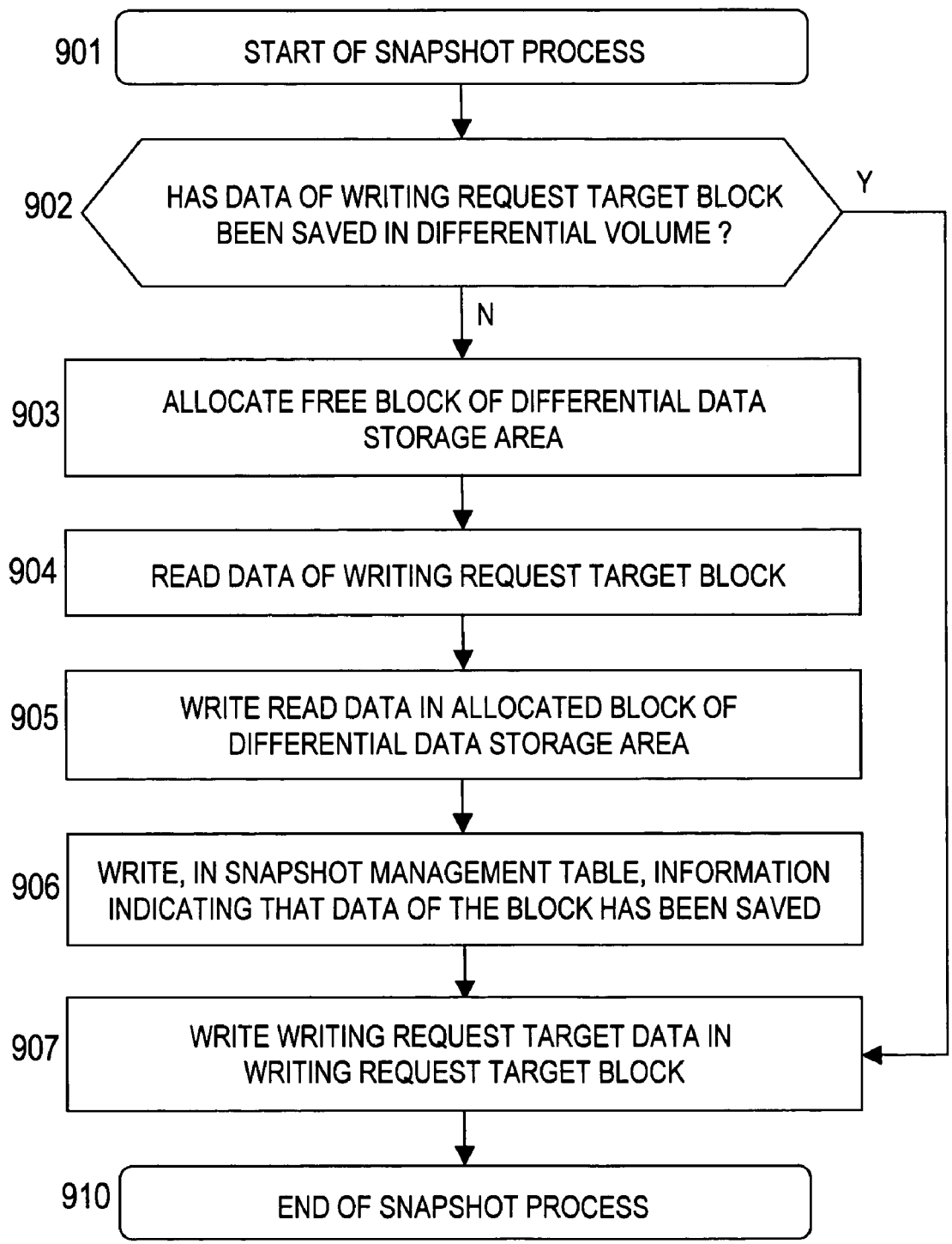
FIG. 9 is a flowchart showing a conventional snapshot process.

FIG. 9 is a flowchart showing a conventional snapshot process.

To be specific, FIG. 9 is a flowchart of a conventional process executed when writing occurs in a certain block of the primary volume 301 during a snapshot operation. This process is executed by the snapshot processing module 104*a*.

Upon starting a snapshot process (step 901), the snapshot processing module 104*a* judges whether data stored in the writing request target block has been saved or not in the differential volume 302 (step 902). The saving means copying of data stored in the primary volume 301 to the differential data storage area 303 of the differential volume 302.

If the data is judged to have been saved in the step 902, the process proceeds to a step 907.

On the other hand, if the data is not judged to have been saved in the step 902, the snapshot processing module 104*a* allocates a free block of the differential data storage area 303 (step 903).

Then, the snapshot processing module 104*a* reads data stored in the writing request target block (step 904).

The snapshot processing module 104*a* writes the read data in the differential data storage area allocated in the step 903 (step 905). The steps 904 and 905 correspond to the "saving" process.

The snapshot processing module 104*a* writes information indicating saving of the data of the target block in the snapshot management table 304 (step 906). To be specific, the snapshot processing module 104*a* writes information indicating a relation among a block address of the primary volume 301 indicating the writing request target block, a block address of the differential volume 302 indicating a data saving destination of the block, and a generation number.

Next, the snapshot processing module 104*a* writes the writing request target data in the writing request target block of the primary volume 301 (step 907).

Thus, the snapshot process is completed (step 910).

Figure 10:
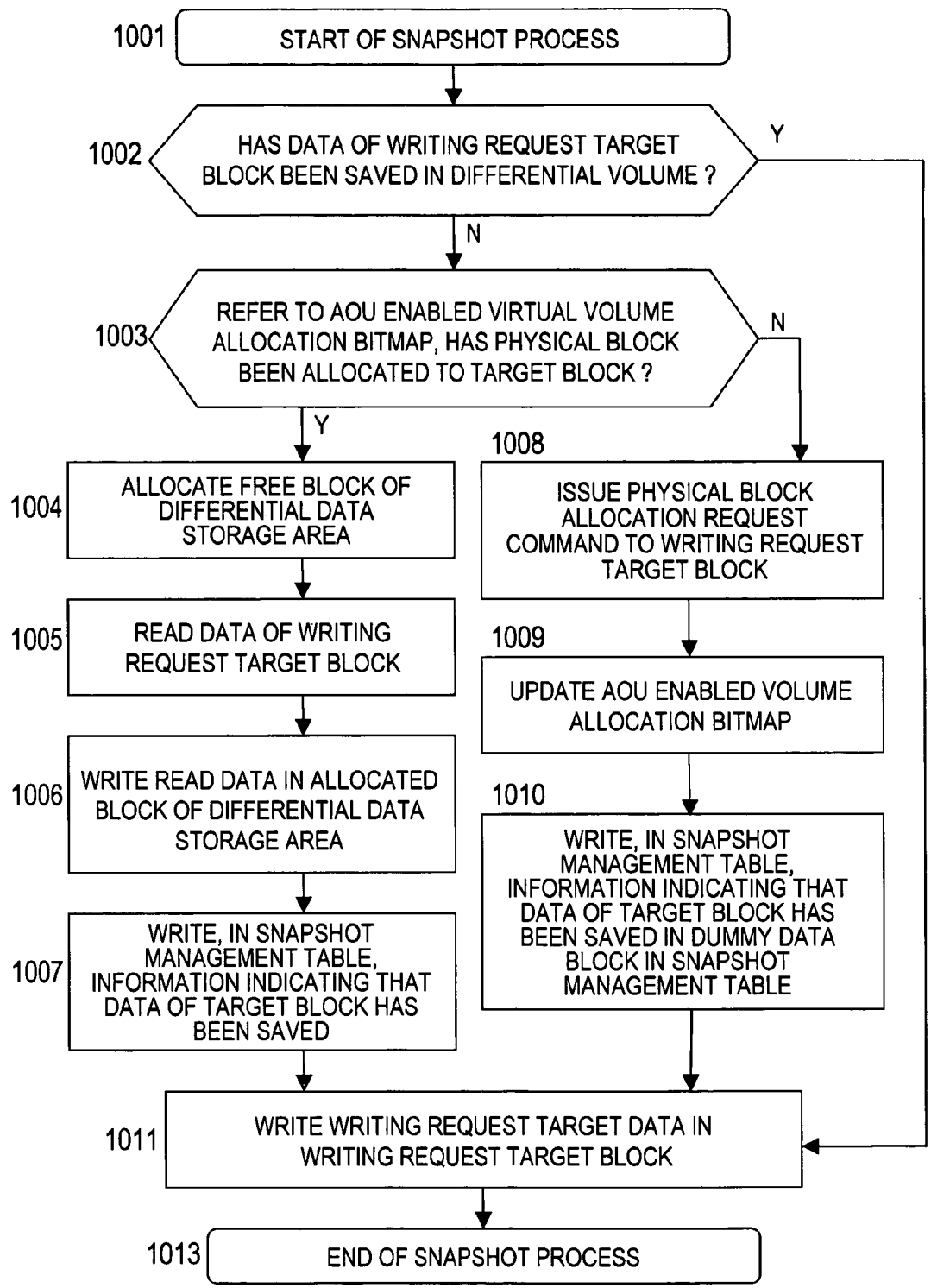
FIG. 10 is a flowchart showing a snapshot process executed by a snapshot processing module according to the first embodiment of this invention.

FIG. 10 is a flowchart showing a snapshot process executed by the snapshot processing module 104 according to the first embodiment of this invention.

Upon reception of a data writing request targeting a block in the primary volume 301 from the file system processing module 103, the snapshot processing module 104 executes the snapshot process of FIG. 10.

Upon starting a snapshot process (step 1001), the snapshot processing module 104 first judges whether data stored in the writing request target block has been saved or not in the differential volume 302 (step 1002).

If the data is judged to have been saved in the step 1002, the process proceeds to a step 1011.

On the other hand, if the data is not judged to have been saved in the step 1002, the snapshot processing module 104 refers to the AOU enabled virtual volume allocation bitmap 106 to judge whether a physical block has been allocated or not to the writing request target block (step 1003).

If the physical block is judged to have been allocated in the step 1003, there is data stored in the writing request target block. In this case, since it is necessary to save the data, the snapshot processing module 104 sequentially executes steps 1004 to 1007. These four steps are similar to the steps 903 to 906 of FIG. 9, and thus description thereof will be omitted.

On the other hand, if no physical block is judged to have been allocated in the step 1003, there is no data stored in the writing request target block. In this case, it is not necessary to save the data. The snapshot processing module 104 issues a physical block allocation request command to the writing request target block (step 1008). The step 1008 is only a process for improving performance, and thus it can be omitted. When the step 1008 is omitted, the microprogram 111 automatically executes allocation in the step 1011 described below. In this case, a next step 1009 is executed after the step 1011.

Next, the snapshot processing module 104 updates a value of an area corresponding to the writing request target block to "1" (i.e., allocated) in the AOU enabled virtual volume allocation bitmap 106 (step 1009).

Next, the snapshot processing module 104 writes information indicating saving of the data stored in the writing request target block in the dummy data block 305 in the snapshot management table 304 (step 1010). According to the embodiment, the dummy data block 305 is physically allocated. However, even when the dummy data block 305 is not physically allocated, dummy data may be logically indicated by storing data such as "0" in a field of a saving destination block address.

Next, the snapshot processing module 104 writes the writing request target data in the writing request target block (step 1011). Thus, the snapshot process of the embodiment is completed (step 1013).

FIGS. 1 and 2 show the storage system configured by interconnecting the NAS 101 and the storage device 110 separated from each other through a fiber channel or the like. However, the embodiment is not limited to the separated form of the NAS 101 and the storage device 110. It can be realized even in a storage system of a type in which the storage device 110 incorporates the NAS 101.

Figure 11:
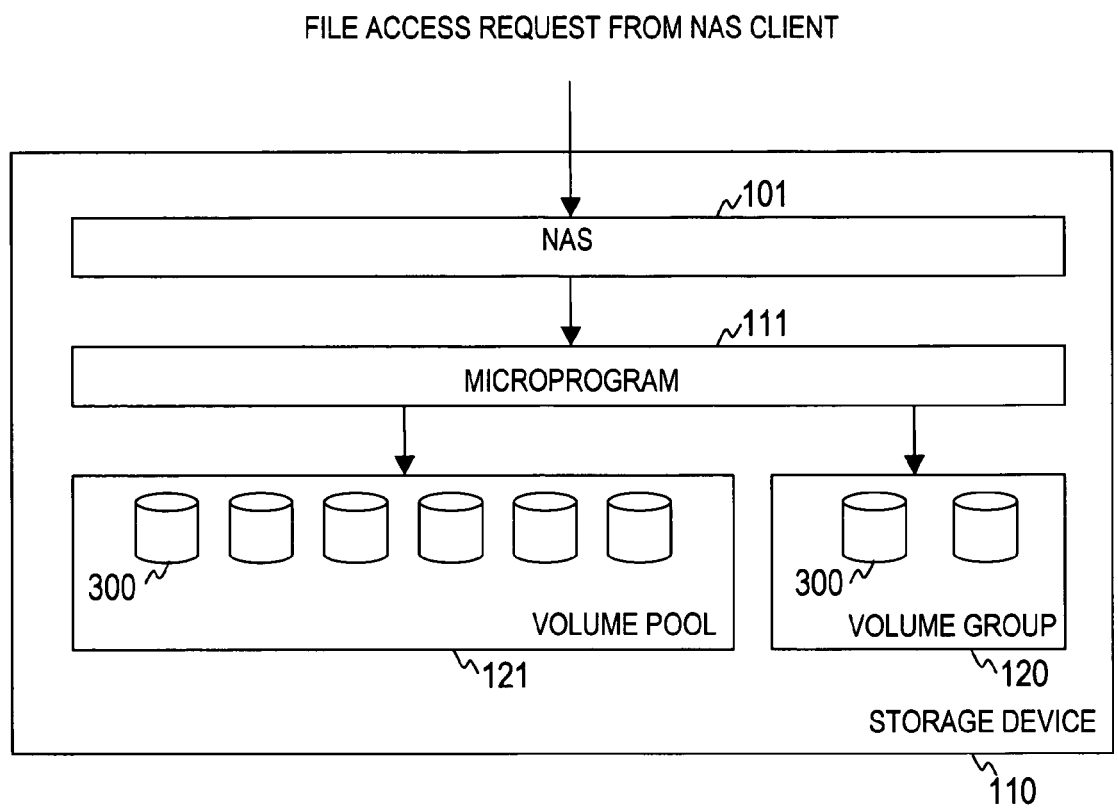
FIG. 11 is a functional block diagram according to a modified example of the first embodiment of this invention.

FIG. 11 is a functional block diagram showing a modified example of the first embodiment of this invention.

A storage system shown in FIG. 11 is configured by incorporating a NAS 101 in the storage device 110 of FIGS. 1 and 2. Configurations of the NAS 101 and a microprogram 111 are similar to those of FIGS. 1 and 2. However, in the configuration of FIG. 11, the NAS 101 and the microprogram 111 may be connected to each other through a dedicated bus or the like.

A process executed in the storage system shown in FIG. 11 is similar to that of the first embodiment, and thus description thereof will be omitted.

It should be noted that second, third, and fifth embodiments described below can be realized by the storage system shown in FIG. 11.

According to the first embodiment of this invention, in the initialization process, the AOU enabled virtual volume allocation bitmap 106 regarding all the blocks of the primary volume 301 is created (refer to FIGS. 7 and 8). By referring to the created allocation bitmap, issuance of an I/O command for unnecessary copy processing can be omitted. Thus, as the I/O command is optimized, it is possible to achieve a high speed for an I/O command process.

Next, a second embodiment of this invention will be described.

The NAS 101 of the first embodiment of this invention first obtains the allocation bitmap corresponding to all the blocks of the primary volume 301, and registers the allocation bitmap in the AOU enabled virtual volume allocation bitmap 106. On the other hand, a NAS 101 of the second embodiment of this invention obtains an allocation bitmap corresponding to a block constituting a part of a primary volume when each I/O command is issued.

Figure 12:
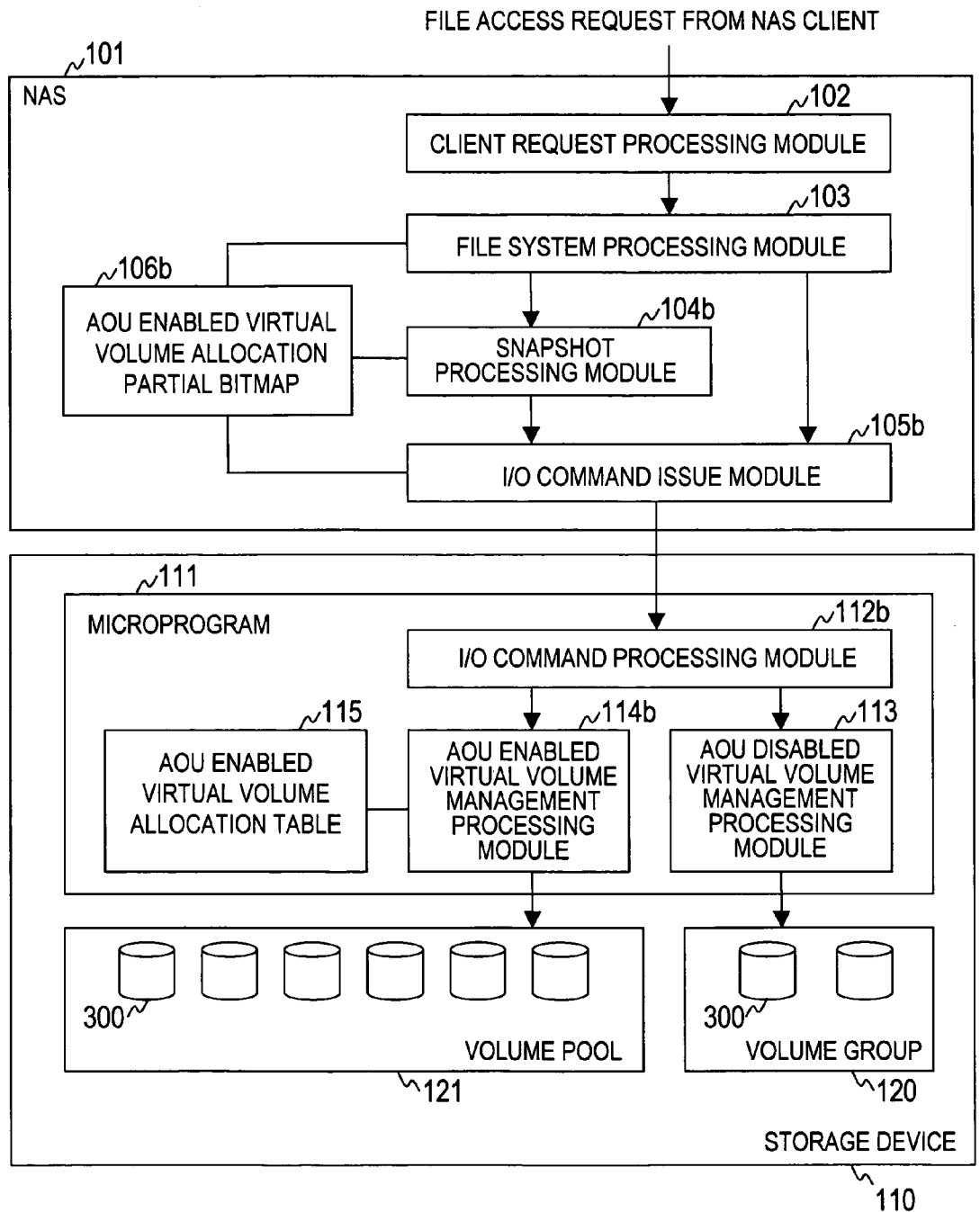
FIG. 12 is a functional block diagram of a storage system according to a second embodiment of this invention.

FIG. 12 is a functional block diagram of the storage system according to the second embodiment of this invention.

A configuration difference of the embodiment shown in FIG. 12 from the first embodiment shown in FIG. 2 lies in a snapshot processing module 104b, an I/O command issue module 105b, an AOU enabled virtual volume allocation partial bitmap 106b, and an I/O command processing module 112b. As in the case of the first embodiment, these are stored in a NAS main memory 153 or a storage device main memory 158. Other portions are similar to those of the first embodiment, and thus description thereof will be omitted.

Figure 13:
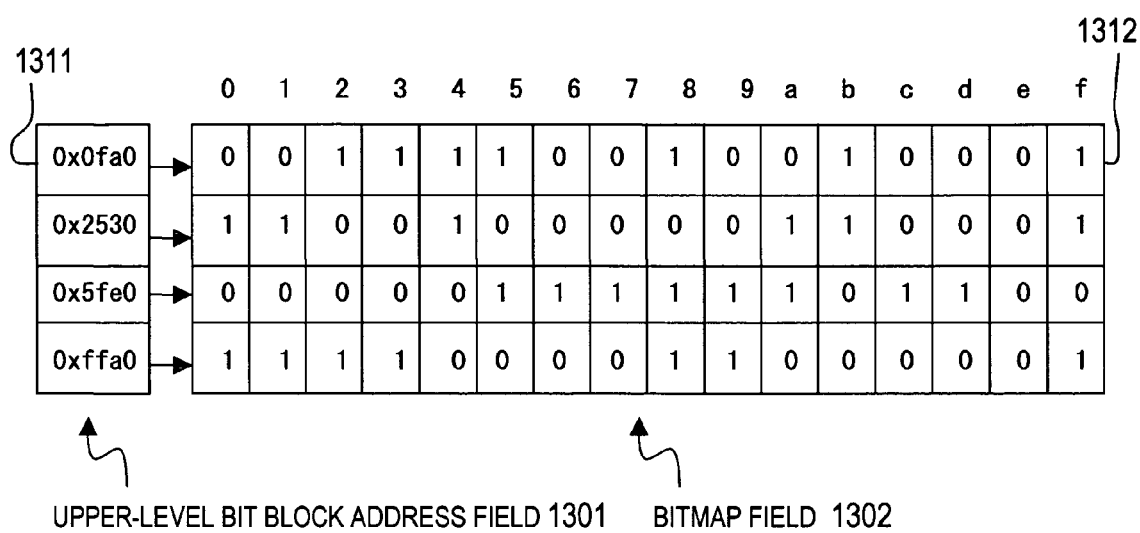
FIG. 13 is an explanatory diagram of an AOU enabled virtual volume allocation bitmap according to the second embodiment of this invention.

FIG. 13 is an explanatory diagram of the AOU enabled virtual volume allocation partial bitmap 106b according to the second embodiment of this invention.

The AOU enabled virtual volume allocation partial bitmap 106b is constituted of an upper-level bit block address field 1301 and a bitmap field 1302. An upper-level bit block address of a held bitmap is stored in the upper-level bit block address field 1301. In the bitmap field 1302, a bitmap indicating an allocation state of a predetermined number of blocks starting from the upper-level bit block address of the upper-level bit block address field 1301 is stored. Values of "0" to "f" shown in the bitmap field 1301 of FIG. 13 are least significant byte values of block addresses.

In an example of FIG. 13, a bitmap indicting an allocation state of 16 blocks is stored for each upper-level bit block address. For example, an upper-level bit block address "0x0fa0" is stored in the upper-level bit block address field 1301 (entry 1311), and a bitmap indicating an allocation state of blocks at block addresses "0x0fa0" to "0x0faf" is stored in the bitmap field 1302 corresponding to this block address (entry 1312).

The value stored in the bitmap field 1302 is similar in meaning to the AOU enabled virtual volume allocation bitmap 106. In other words, a case where a value is "0" indicates that no physical block has been allocated to a block corresponding to the bit. A case where a value is "1" indicates that a physical block has been allocated to the block corresponding to the bit.

In the example of FIG. 13, information on an allocation state of 16 blocks from the upper level is stored in the bitmap field 1302 corresponding to each upper-level bit block. A size of the upper-level bit block address field 1301 is finite. In the example of FIG. 13, the size is limited to 4 entries. Accordingly, the AOU enabled virtual volume allocation partial bitmap 106b cannot store information on all the blocks of the primary volume 301.

As in the case of the AOU enabled virtual volume allocation bitmap 106, the upper-level bit block address field 1301 and the bitmap field 1302 are held for each volume.

Figure 14:
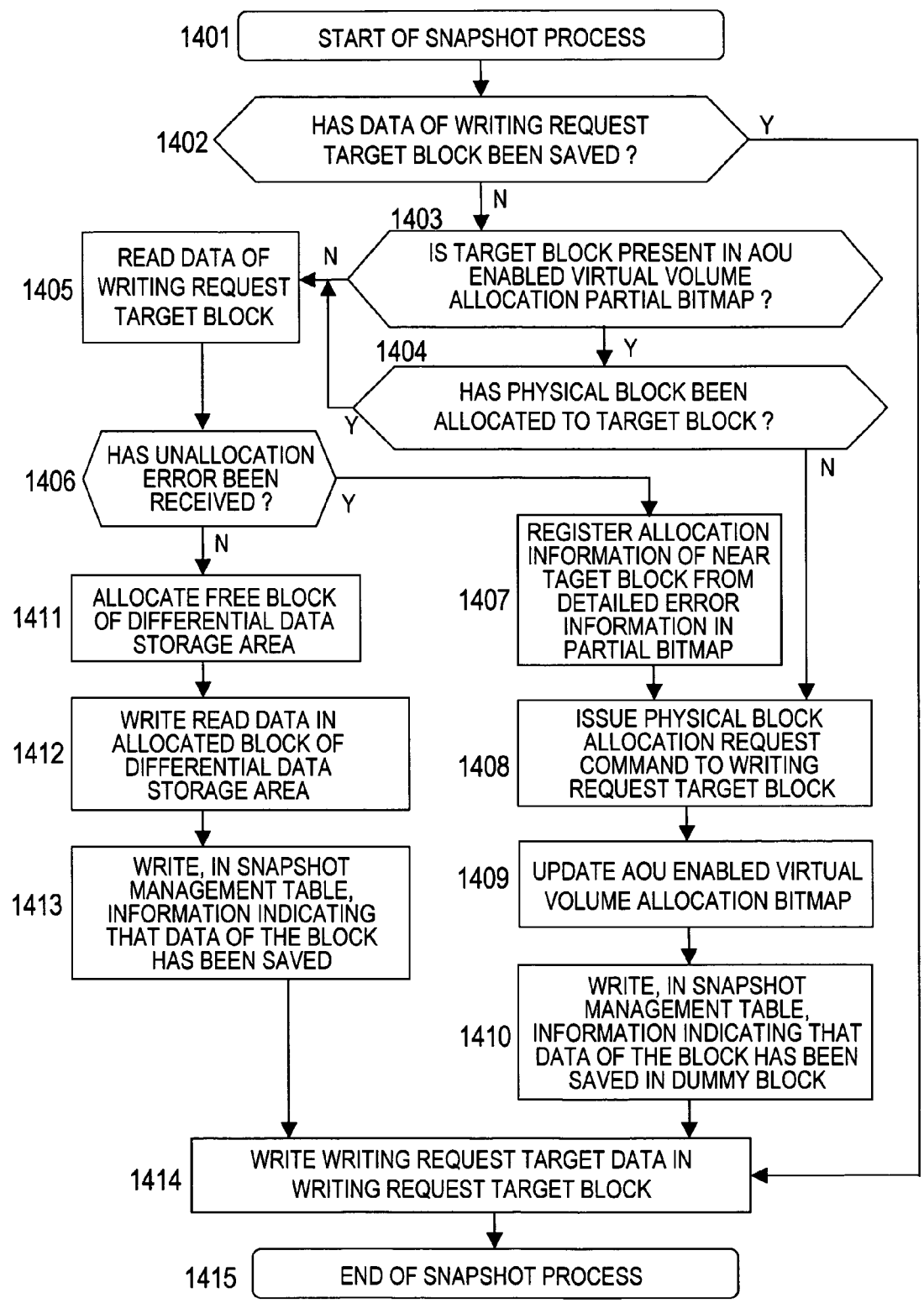
FIG. 14 is a flowchart showing a snapshot process executed by a snapshot processing module according to the second embodiment of this invention.

FIG. 14 is a flowchart showing a snapshot process executed by the snapshot processing module 104b according to the second embodiment of this invention.

Upon reception of a data writing request targeting a block in the primary volume 301 from the file system processing module 103, the snapshot processing module 104b executes the snapshot process of FIG. 14.

Upon starting a snapshot process (step 1401), the snapshot processing module 104b first judges whether data stored in the writing request target block has been saved or not in the differential volume 302 (step 1402).

If the data is judged to have been saved in the step 1402, the snapshot processing module 104b proceeds to a step 1414.

On the other hand, if the data is not judged to have been saved in the step 1402, the snapshot processing module 104b judges whether a bitmap corresponding to a writing request target block is present or not in the AOU enabled virtual volume allocation partial bitmap 106b (step 1403).

For example, when the AOU enabled virtual volume allocation partial bitmap 106b is as shown in FIG. 13, and when block addresses of writing request target blocks are "0x0fa0" to "0x0faf", "0x2530" to "0x253f", "0x5fe0" to "0x5fef", or "0xffa0" to "0xffaf", it is judged that there is a bitmap corresponding to the writing request target blocks. The AOU enabled virtual volume allocation partial bitmap 106b does not include any bitmaps in an initial state unless it obtains an allocation bitmap by initialization shown in FIG. 7.

If it is judged in the step 1403 that there is no bitmap corresponding to the writing request target blocks, the snapshot processing module 104b cannot judge whether a physical block has been allocated or not to the target block by referring to the AOU enabled virtual volume allocation partial bitmap 106b. In this case, the process proceeds to a step 1405.

On the other hand, if it is judged in the step 1403 that there is a bitmap, the snapshot processing module 104b refers to the bitmap to judge whether a physical block has been allocated or not to the writing request target block (step 1404).

If the physical block is judged to have been allocated in the step 1404, it is necessary to save data stored in the target block. In this case, the process proceeds to the step 1405.

On the other hand, if no physical block is judged to have been allocated in the step 1404, there is no data stored in the target block. Thus, it is not necessary to save data. In this case, the process proceeds to a step 1408.

In the step 1405, the snapshot processing module 104b reads the data stored in the writing request target block.

Next, the snapshot processing module 104b judges which of an unallocation error and warning a response received from a microprogram 111 having executed a reading command is (step 1406). Such the error or warning indicates unallocation of a physical block to a reading command target block (i.e., writing request target block). A process executed by the microprogram 111 which has received the reading command will be described in detail below referring to FIG. 15.

If it is judged in the step 1406 that the unallocation error or the warning has been received, the snapshot processing module 104b obtains allocation information of a block near the reading command target block from detailed information contained in the response of the error or the like. Then, the snapshot processing module 104b registers the obtained allocation information in the AOU enabled virtual volume allocation partial bitmap 106b (step 1407). The detailed information contained in the response of the error or the like will be described in detail below referring to FIG. 15.

Next, the snapshot processing module 104b sequentially executes steps 1408 to 1410. These steps are similar to the steps 1008 to 1010, and thus description thereof will be omitted.

On the other hand, if it is judged in the step 1406 that a response from the microprogram 111 is a normal end (i.e., neither unallocation error nor warning has been received), a physical block has been allocated to the reading command target block. In other words, there is a physical block allocated to the writing request target block. In this case, the process proceeds to a step 1411. The steps 1411 to 1413 are similar to the steps 1004, 1006, and 1007 of FIG. 10, and thus description thereof will be omitted.

After execution of the step 1410 or 1413, the snapshot processing module 104b executes a step 1414. The step 1414 is similar to the step 1011 of FIG. 10, and thus description thereof will be omitted.

Thus, the snapshot process is completed (step 1415).

Figure 15:
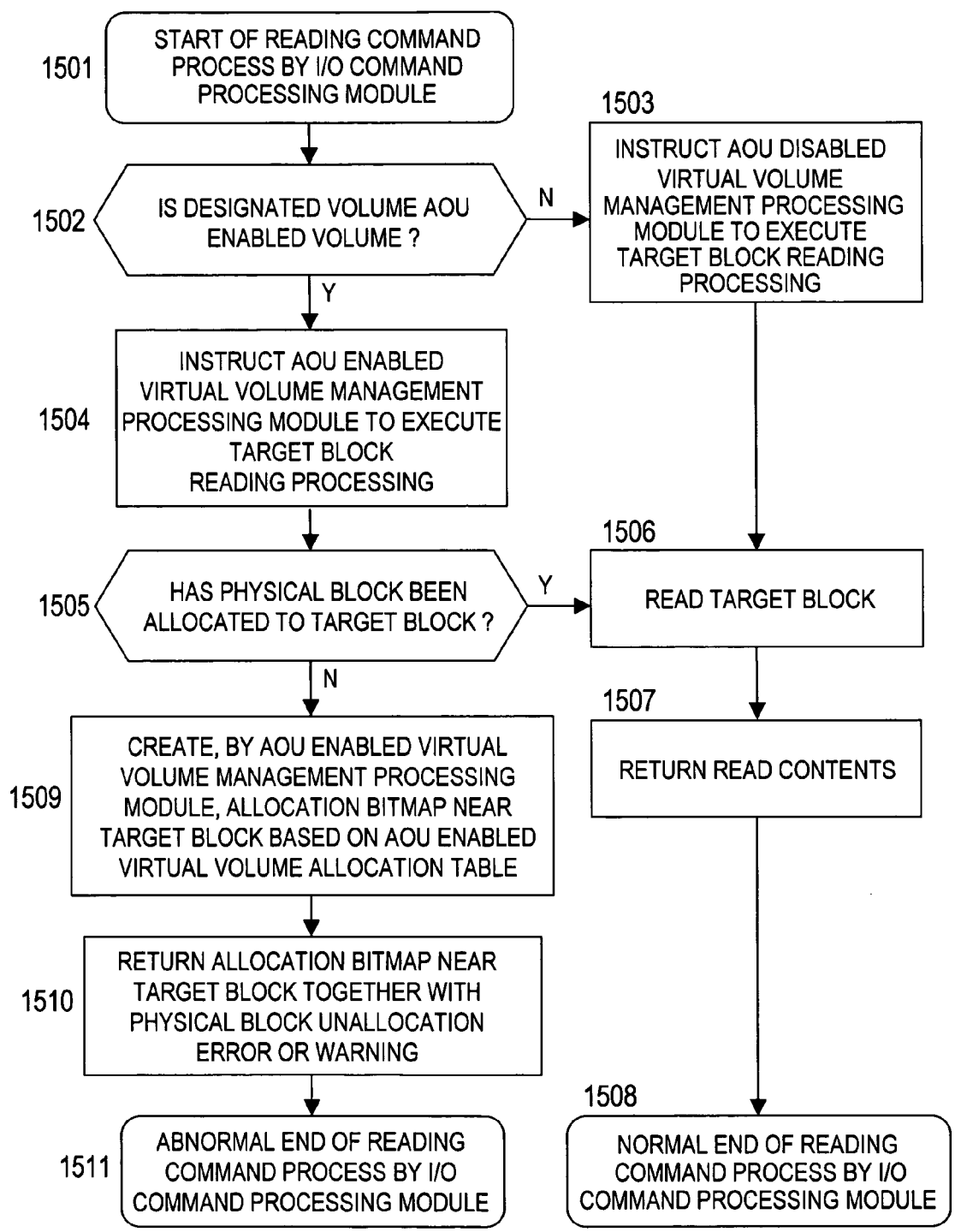
FIG. 15 is a flowchart showing a reading command process executed by an I/O command processing module when a reading command is received according to the second embodiment of this invention.

FIG. 15 is a flowchart of a reading command process executed by the I/O command processing module 112b when the reading command is received according to the second embodiment of this invention.

Upon starting the reading command process (step 1501), the I/O command processing module 112b first judges whether a target volume designated by the reading command is an AOU enabled virtual volume or not (step 1502).

If it is judged in the step 1502 that the target volume of the reading command is not an AOU enabled virtual volume, physical blocks have always been allocated to all the blocks of the target volume. In this case, the I/O command processing module 112b instructs the AOU disabled virtual volume management processing module 113 to execute reading processing of the target block of the reading command (step 1503). Subsequently, the process proceeds to a step 1506.

On the other hand, if it is judged in the step 1502 that the target volume of the reading command is an AOU enabled virtual volume, no physical block may not have been allocated to the target block of the reading command. In this case, the I/O command processing module 112b instructs the AOU enabled virtual volume management processing module 114b to execute reading processing of the target block (step 1504).

Next, the I/O command processing module 112b judges whether a physical block has been allocated or not to the target block based on an AOU enabled virtual volume allocation table 115 (step 1505).

If it judged in the step 1505 that a physical block has been allocated, the I/O command processing module 112b reads data stored in the target block of the reading command (step 1506).

Then, the I/O command processing module 112b returns the read data as a response to the I/O command issue module 105b (step 1507).

After execution of the step 1507, the I/O command processing module 112b brings the reading command process to a normal end (step 1508).

On the other hand, if it is judged in the step 1505 that no physical block has been allocated, data cannot be read from the target block of the reading command. In this case, the AOU enabled virtual volume management processing module 114b creates an allocation bitmap regarding a block near the target block of the reading command based on the AOU enabled virtual volume allocation table 115 (step 1509). The block near the target block is one or more blocks including a block identified by a block address successive to a block address for identifying the target block of the reading command.

For example, when a block address of the target block of the reading command is "0x0fa0" shown in FIG. 13, a block nearby may be one or more blocks including a block whose block address is "0x0fa1" (e.g., 15 blocks of "0x0fa1" to "0x0faf"). For example, the allocation bitmap near the target block may be an allocation bitmap of a predetermined number of blocks before and after the target block, an allocation bitmap of continuous unallocated blocks including the target block, or an allocation bitmap of the entire volume.

Next, the I/O command processing module 112b returns detailed error information with an error or warning in response to the reading command (step 1510). The detailed error information include the allocation bitmap near the target block of the reading command. In the case of returning the error as a response, the I/O command processing module 112b does not return read data which becomes a command execution result as a response. On the other hand, in the case of returning the warning, the I/O command processing module 112b returns, e.g., dummy data of "0" or the like as a response.

After execution of the step 1510, the I/O command processing module 112b brings the reading command process to an abnormal end (step 1511).

According to the second embodiment of this invention, when there is no physical block allocated to the target block of the I/O command, the allocation bitmap regarding the block near the target block is created. In other words, since it is not necessary to create an AOU enabled virtual volume allocation bitmap 106 regarding all the blocks of the primary volume 301, a capacity of the NAS main memory 153 can be saved. Furthermore, when sequential access is executed, a plurality of I/O commands targeting a plurality of blocks whose addresses are continuous are continuously issued. In this case, when an allocation bitmap regarding the block near the target block is created, it is not necessary to create an allocation bitmap for each I/O command. Hence, it is possible to suppress a reduction in processing speed.

Next, a third embodiment of this invention will be described.

The third embodiment relates to an area allocation system of an application of the first and second embodiments. The application may realize an optional function such as a file system or a database. In other words, the embodiment can be applied to an optional application. The embodiment will be described below by taking an example of a file system. Thus, the embodiment can be realized even when the "file system" is substituted with an optional application.

First, an outline of the embodiment will be described.

No physical block is allocated to a block constituting an AOU enabled virtual volume before a writing request is received. Thus, normally, a block having a physical block allocated thereto is used by the file system. However, when a file is subsequently deleted, the block in which the deleted data has been stored still holds the physical block allocated thereto, but it is not used by the file system. Accordingly, in the AOU enabled virtual volume, a block to which a physical block has been allocated but which is not used by the file system may be present.

For example, it is presumed that among the blocks 401a to 401d shown in FIG. 4, the block 401a is used by the file system while the block 401d is not used. Needless to say, the blocks 401b and 401c to which no physical block has been allocated are not used by the file system. In this case, when it is necessary for the file system to newly use one of the blocks, there arises a problem of which block is to be selected and used.

First, a case where a block having no physical block allocated thereto (e.g., block 401b) is selected will be described. In this case, when a writing request targeting the block 401b is issued first, data saving is not executed since there is no physical block allocated to the block 401b. Accordingly, writing processing is executed at a high speed. In this case, however, as the block 401d still holds the physical block allocated thereto even when it is not used by the file system, three physical blocks are consumed. Hence, such selection is not preferable to effectively use a storage capacity of the volume pool 121.

Next, a case where the block 401d having a physical block allocated thereto is selected will be described. In this case, when a writing request targeting the block 401d is issued first, data saving is executed since a physical block has been allocated to the block 401d. Accordingly, writing processing is delayed. In this case, however, since only tow physical blocks allocated to the blocks 401a and 401d are consumed, the storage capacity of the volume pool 121 is effectively used.

In order to improve performance, a block to which no physical block has been allocated is preferably selected. In order to save a capacity a block to which a physical block has been allocated is preferably selected. According to the embodiment, a policy to decide which of performance and a capacity takes precedence is set, and a block to be used is selected according to the policy.

Figure 16:
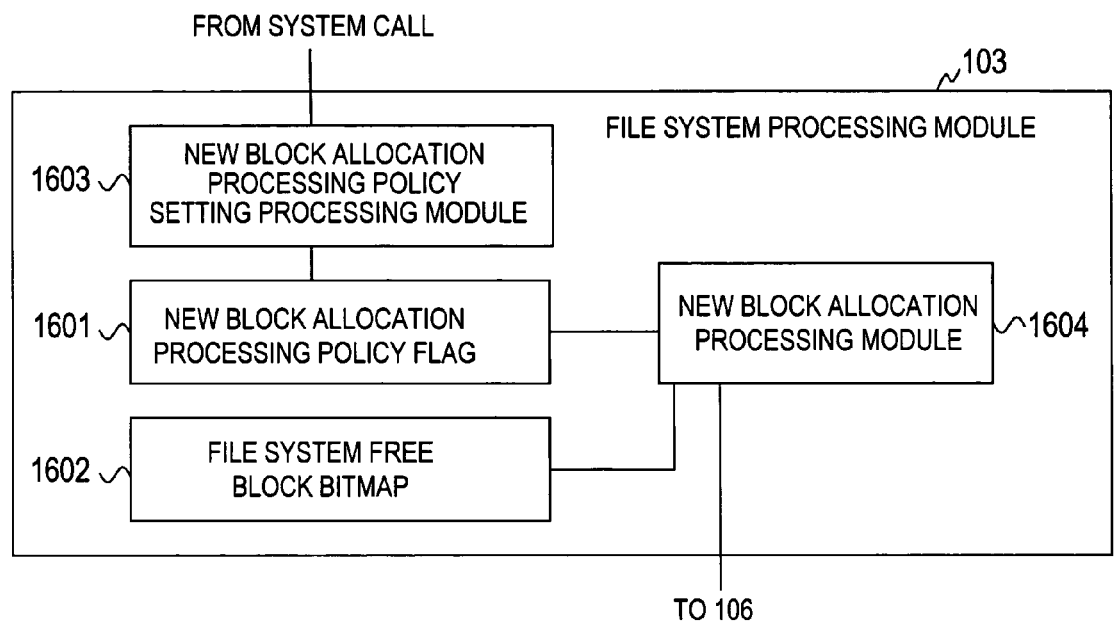
FIG. 16 is an explanatory diagram of a file system processing module according to a third embodiment of this invention.

FIG. 16 is an explanatory diagram of a file system processing module 103 according to the third embodiment of this invention.

To be specific, among components of the file system processing module 103, FIG. 16 shows a new block allocation processing policy flag 1601, a file system free block bitmap 1602, a new block allocation processing policy setting processing module 1603, and a new block allocation processing module 1604. These are processing or information storage modules concerning this invention. The file system processing module 103 includes processing modules in addition to those shown in FIG. 16, but description thereof will be omitted since they are not directly related to this invention.

The new block allocation processing policy setting processing module 1603 and the new block allocation processing module 1604 are subprograms of the file system processing module 103. Thus, processes executed by these modules are actually executed by a CPU 151. The new block allocation processing policy flag 1601 and the file system free block bitmap 1602 are stored in a NAS main memory 153.

The new block allocation processing policy flag 1601 is a flag for deciding what policy is used to execute block allocation, i.e., which of capacity saving and snapshot performance improvement should take precedence, when a new block allocation process (described below) is executed.

The file system free block bitmap 1602 is a bitmap for managing blocks of a volume used by the file system and unused blocks shown in FIG. 17.

The new block allocation processing policy setting processing module 1603 is a subprogram executed when a NAS administrator changes the allocation policy via a system call. A process executed by the new block allocation processing policy setting processing module 1603 (shown in FIG. 18) will be described below in detail.

The new block allocation processing module 1604 is a subprogram for newly allocating a block to be used by the file system according to the set allocation policy. This process shown in FIG. 19 will be described below in detail.

FIG. 17 is an explanatory diagram of the file system free block bitmap 1602 according to the third embodiment of this invention.

As in the case of the AOU enabled virtual volume allocation bitmap 106 shown in FIG. 6, the file system free block bitmap 1602 includes an area for storing a bit value of "0" or "1" for each block address. A correlation between each block address and each area is similar to that shown in FIG. 6, and thus description thereof will be omitted.

A case where the value stored in the area of the file system free block bitmap 1602 is "0" indicates that a block corresponding to the area is not used by the file system (i.e., the block is a free block). On the other hand, a case where the value stored in the area is "1" indicates that the block corresponding to the area is used by the file system.

FIG. 17 shows an example of the file system free block bitmap 1602 when the AOU enabled virtual volume allocation bitmap 106 is as shown in FIG. 6.

A physical block is always allocated to the block used by the file system (e.g., refer to area 1701 whose block address is "0x0002").

On the other hand, there is a block not used by the file system while a physical block has been allocated thereto (e.g., refer to area 1702 whose block address is "0x0049").

Figure 18:
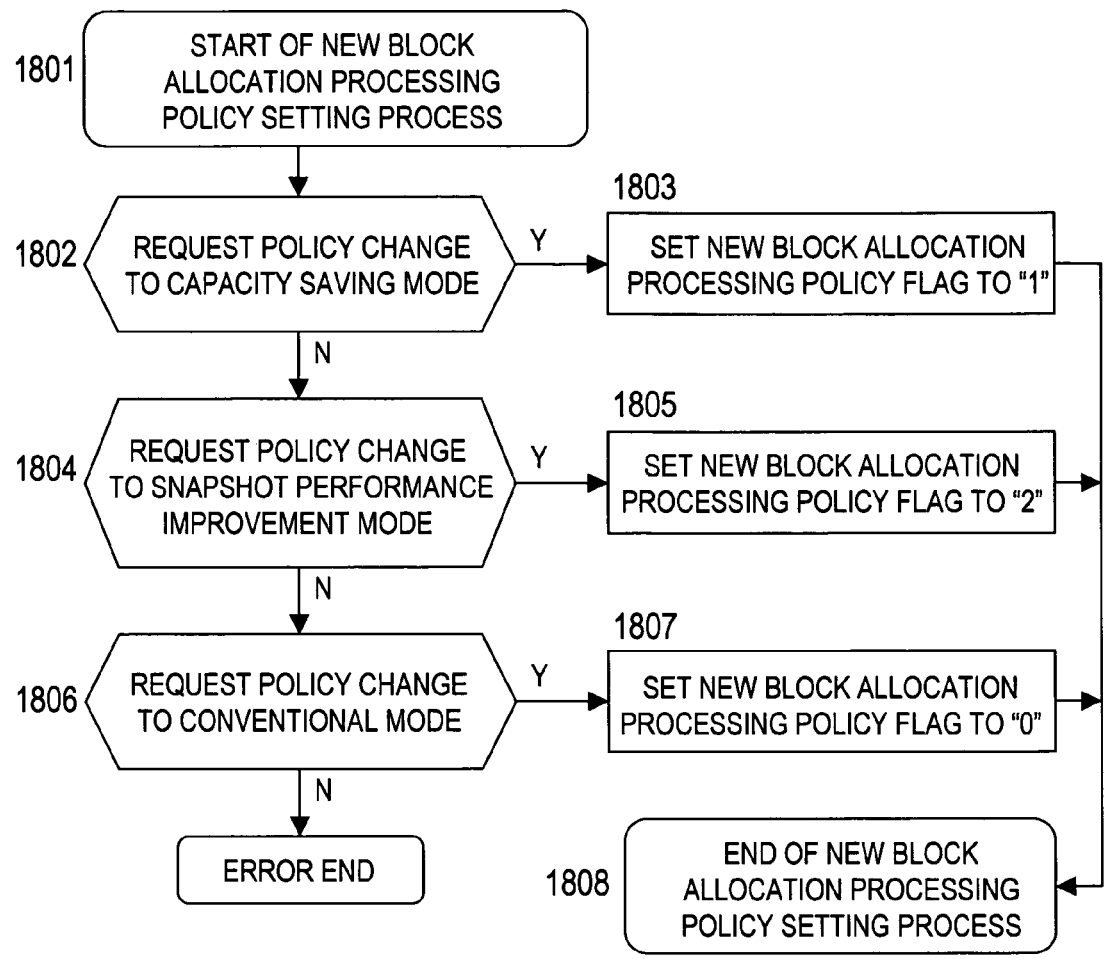
FIG. 18 is a flowchart of a process of setting a new block allocation processing policy executed according to the third embodiment of this invention.

FIG. 18 is a flowchart of a new block allocation processing policy setting process executed according to the third embodiment of this invention.

The process of FIG. 18 is executed by the new block allocation processing policy setting processing module 1603.

First, the new block allocation processing policy setting process is started via a system call (step 1801).

The new block allocation processing policy setting processing module 1603 first judges whether a request received from a NAS administrator is a policy changing request to a capacity saving mode or not (step 1802).

If it is judged in the step 1802 that the request is a changing request to the capacity saving mode, the new block allocation processing policy setting processing module 1603 sets a new block allocation processing policy flag 1601 to "1" (step 1803) to finish the process (step 1808).

On the other hand, if it is judged in the step 1802 that the request is not a changing request to the capacity saving mode, the new block allocation processing policy setting processing module 1603 judges whether the received request is a policy changing request to a snapshot performance improvement mode or not (step 1804).

If it is judged in the step 1804 that the request is a policy changing request to the snapshot performance improvement mode, the new block allocation processing policy setting processing module 1603 sets a new block allocation processing policy flag 1601 to "2" (step 1805) to finish the process (step 1808).

On the other hand, if it is judged in the step 1804 that the request is not a policy changing request to the snapshot performance improvement mode, the new block allocation processing policy setting processing module 1603 judges whether the received request is a policy changing request to a conventional mode or not (step 1806).

If it is judged in the step 1806 that the request is a policy changing request to the conventional mode, the new block allocation processing policy setting processing module 1603 sets a new block allocation processing policy flag 1601 to "0" (step 1807) to finish the process (step 1808).

On the other hand, if it is judged in the step 1806 that the request is not a policy changing request to the conventional mode, the new block allocation processing policy setting processing module 1603 regards the received request as an illegal mode change to finish the process as an error.

Figure 19:
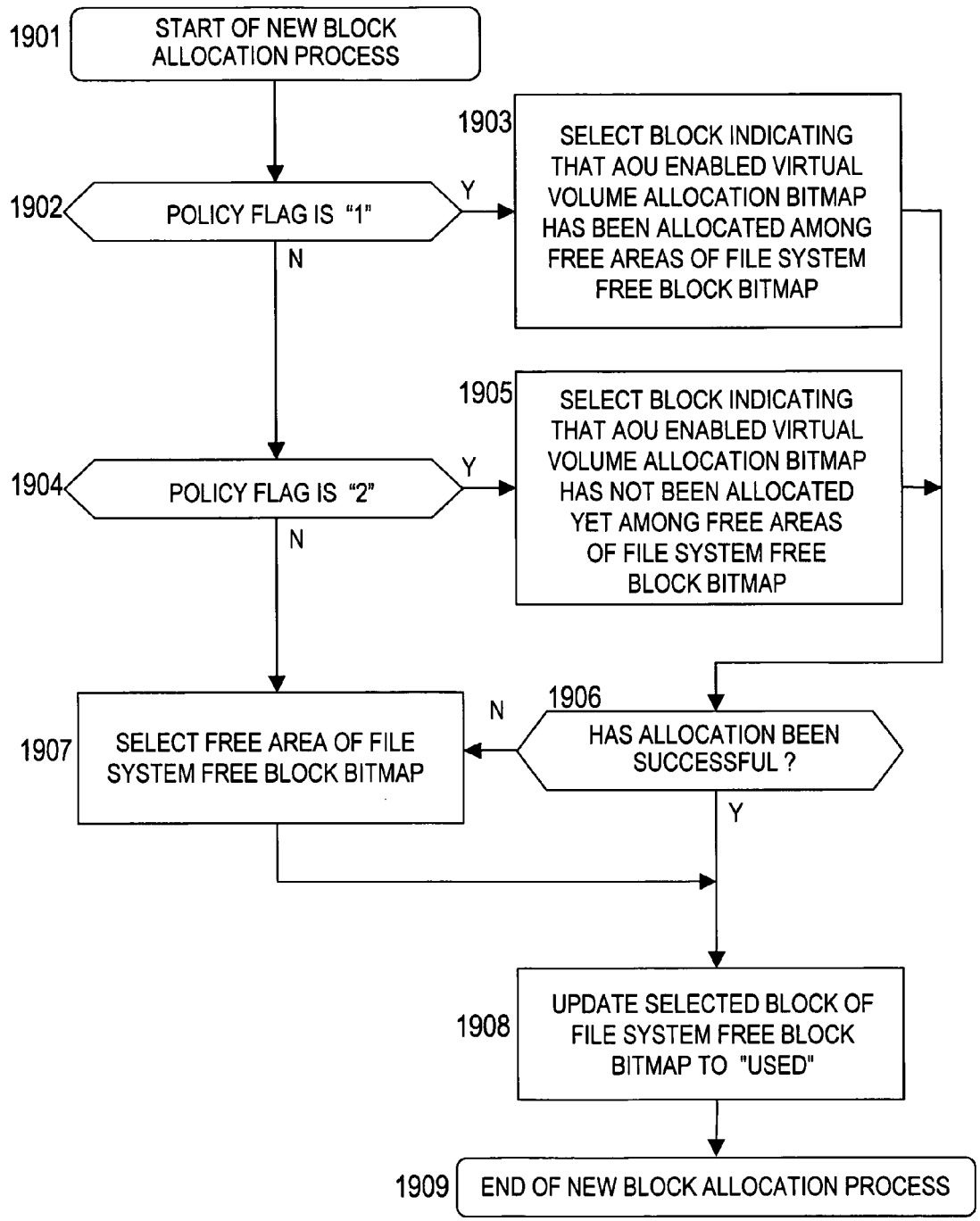
FIG. 19 is a flowchart of a new block allocation process executed according to the third embodiment of this invention.

FIG. 19 is a flowchart of a new block allocation process executed according to the third embodiment of this invention.

The process of FIG. 19 is executed by the new block allocation processing module 1604.

When data is written in new area of file or file is extended, the new block allocation process is started (step 1901).

First, the new block allocation processing module 1604 judges whether a new block policy allocation processing policy flag 1601 is "1" or not (step 1902).

If it is judged in the step 1902 that the new block allocation processing policy flag 1601 is "1", the capacity saving mode has been selected. In this case, the new block allocation processing module 1604 selects a block to which a physical block is allocated among areas which are not used by the file system by referring to the AOU enabled virtual volume allocation bitmap 106 and the file system free block bitmap 1602 (step 1903). In the examples of FIGS. 6 and 17, for example, a block corresponding to the area 1702 is selected.

Next, the new block allocation processing module 1604 judges whether the new block allocation has been successful or not. A case where there is no block which satisfies conditions of the step 1903 is judged to be a failure in a step 1906.

If it is judged in the step 1906 that the new block allocation has been successful, the new block allocation processing module 1604 updates a value corresponding to the selected block of the file system free block bitmap 1602 to "1" (i.e., used) (step 1908) to finish the process (step 1909).

On the other hand, if a failure is judged in the step 1906, irrespective of an allocation of a physical block, the new block allocation processing module 1604 selects an areas indicated to be free by the file system free block bitmap (step 1907), and then executes the step 1908 to finish the process (step 1909).

If it is judged in the step 1902 that the new block allocation processing policy flag 1601 is not "1", the new block allocation processing module 1604 judges whether the new block allocation processing policy flag 1601 is "2" or not (step 1904).

If it is judged in the step 1904 that the new block allocation processing policy flag 1601 is "2", the performance improvement mode has been selected. In this case, the new block allocation processing module 1604 selects a block for which unallocation is indicated by the AOU enabled virtual volume allocation bitmap 106 among the areas indicated to be free by the new file system free block bitmap 1602 (step 1905). In the examples of FIGS. 6 and 17, for example, a block whose block address is "0x0000" is selected. The process executed thereafter is similar to that executed after the step 1903. However, in the step 1906, a case where there is no block which satisfies the conditions of the step 1905 is judged as a failure.

If it is judged in the step 1904 that the new block allocation processing policy flag 1601 is not "2", steps 1907 and 1908 are sequentially executed to finish the process (step 1909).

The example where one policy is applied to the entire file system has been described. However, a policy can be set for each file.

According to the third embodiment of this invention, the NAS administrator can select at least one of the mode of saving the capacity of the volume pool and the mode of improving the snapshot performance. The microprogram 111 of the storage device 110 selects a block to be newly used by the application according to the selected mode. As a result, capacity saving or performance improvement is realized.

Next, the fourth embodiment of this invention will be described.

The first to third embodiments relate to the storage system which includes the NAS 101 equipped with the file system processing module 103 and the storage device 110 and in which the NAS 101 is connected to the client computer through the external network 160. Upon reception of the block I/O request form the file system processing module 103, the snapshot processing module 104 of the NAS 101 judges whether or not to save the data stored in the request target data. However, the snapshot processing module 104 may be executed in the module other than the NAS 101 as long as it can receive the block I/O request.

According to the fourth embodiment of this invention, a snapshot processing module 104 is included in a microprogram 111 of a storage device 101 to be executed by a disk controller 157.

Figure 20:
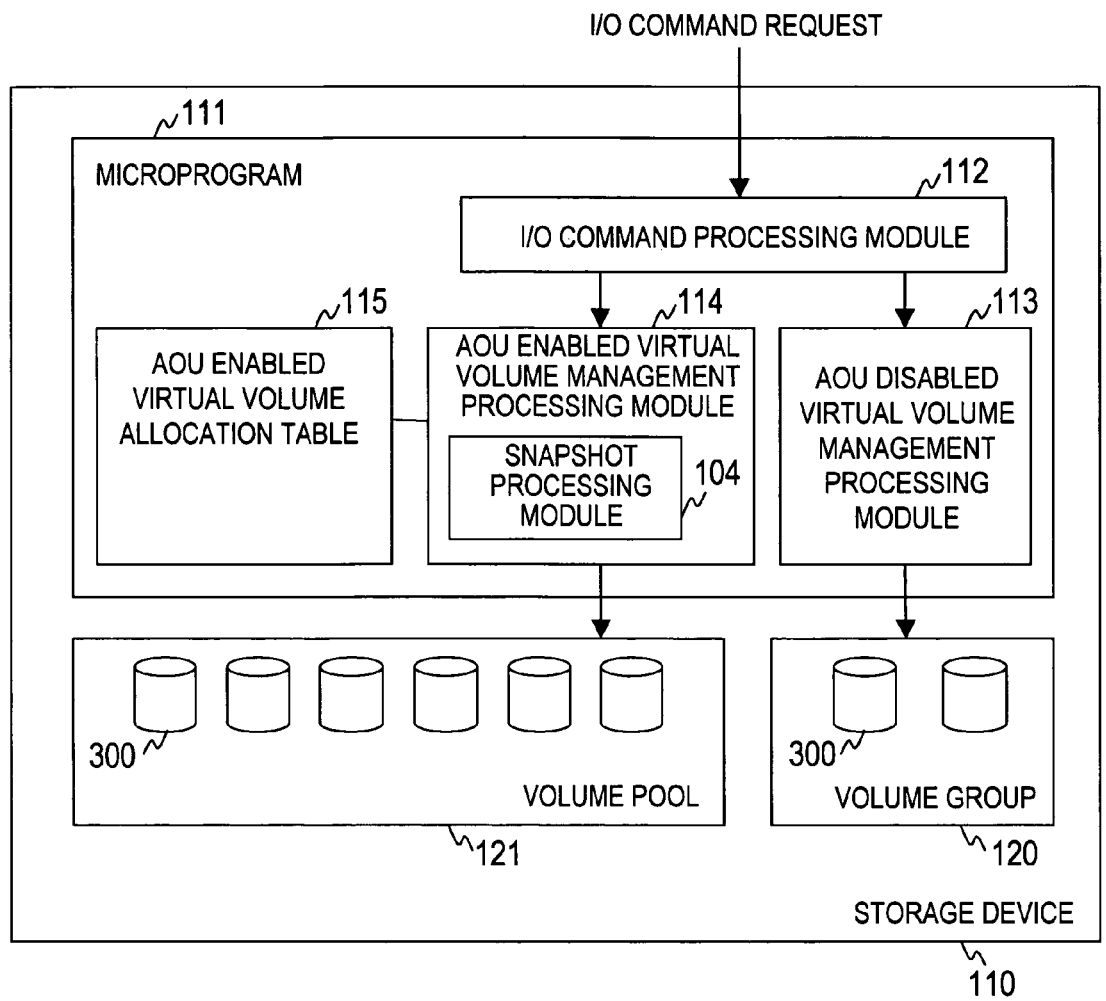
FIG. 20 is a functional block diagram of a storage system according to a fourth embodiment of this invention.

FIG. 20 is a functional block diagram of the storage system according to the fourth embodiment of this invention.

The storage system of the embodiment includes the storage device 110 which receives a block I/O command. A hardware configuration of the storage device 110 is as shown in FIG. 1. An AOU enabled virtual volume management processing module 114 of the microprogram 111 includes a snapshot processing module 104. A process executed by the snapshot processing module 104 will be described in detail below referring to FIG. 21. Other portions are similar to those of the first to third embodiments, and thus description thereof will be omitted.

Figure 21:
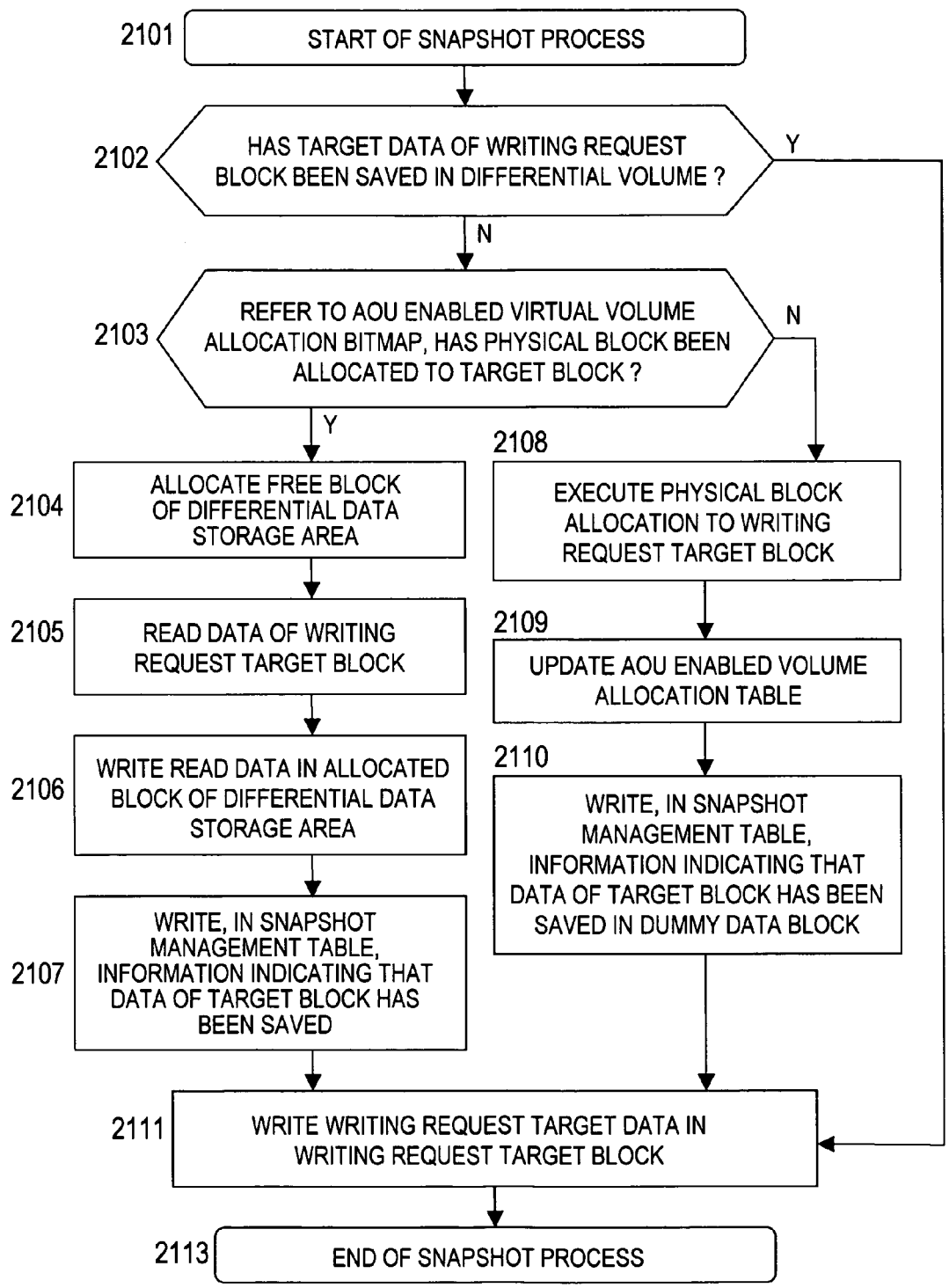
FIG. 21 is a flowchart showing a snapshot process executed by a snapshot processing module according to the fourth embodiment of this invention.

FIG. 21 is a flowchart showing a snapshot process executed by the snapshot processing module 104 according to the fourth embodiment of this invention.

The snapshot processing module 104 according to the fourth embodiment is almost the same as the snapshot processing according to the first embodiment. It should be noted that the snapshot processing module 104 of the fourth embodiment can directly refer to an AOU enabled virtual volume allocation table 115. Accordingly, it is not necessary to create any AOU enabled virtual volume allocation bitmap 106 in initialization processing. It is not necessary to create any AOU enabled virtual volume allocation partial bitmap 106*b* according to an I/O command.

First, the snapshot processing module 104 starts a snapshot process (step 2101).

Next, the snapshot processing module 104 judges whether data stored in the writing request target block has been saved or not in the differential volume 302 (step 2102).

If the data is judged to have been saved in the step 2102, the process proceeds to a step 2111.

On the other hand, if the data is not judged to have been saved in the step 2102, the snapshot processing module 104 refers to the AOU enabled virtual volume allocation table 115 to judge whether a physical block has been allocated or not to the writing request target block (step 2103).

If it is judged in the step 2103 that a physical block has been allocated, the process proceeds to a step 2104. The steps 2104 to 2107 are similar in contents to the steps 1004 to 1007 of FIG. 10 according to the first embodiment, and thus description thereof will be omitted.

On the other hand, if it is judged in the step 2103 that no physical block has been allocated, the snapshot processing module 104 allocates a physical block to the writing request target block (step 2108).

Next, the snapshot processing module 104 updates the AOU enabled virtual volume allocation table 115 (step 2109).

To be specific, information indicating allocation of a physical block to the writing request target block and information for identifying the allocated physical block are newly registered in the AOU enabled virtual volume table 115.

The snapshot processing module 104 writes information indicating saving of data stored in the writing request target block in a dummy data block 305 in a snapshot management table 304 (step 2110). As in the case of the first embodiment, even without physically securing a dummy block 305, dummy data may be logically indicated by storing data such as 0 in a field of a block address of a saving destination. Steps 2108, 2109, and 2110 may be executed in any sequence.

Next, the snapshot processing module 104 writes writing request target data in the writing request target block (step 2111) to finish the snapshot process (step 2113).

According to the fourth embodiment of this invention, the invention can be implemented even in the storage system which receives a block I/O request. For example, this invention can be implemented in a storage system directly connected to a client computer via a SCSI interface.

Next, the fifth embodiment of this invention will be described.

The fifth embodiment is designed to improve a microprogram 111 which processes an I/O command.

According to the first to fourth embodiments, as shown in FIG. 4, the NAS 101 that has received the writing request targeting the block in the primary volume 301 reads the data of the writing request target block (step (3A)), writes the data in the differential data storage area 303 of the differential volume 302 (step (3B)), writes the information for identifying the writing destination in the snapshot management table 304 (step (4)), and then writes the writing request target data in the target block (step (5)). The steps (3A) to (5) correspond to the steps 1005 to 1007 and 1011 of FIG. 10. In short, the NAS 101 sequentially issues one reading command and three writing commands to the storage device 110 for each writing request target block.

By integrating a group of such the series of commands in one command, it is possible to reduce a data transfer amount between the NAS 101 and the storage device 110.

To be specific, the NAS 101 may issue a COPY command in place of the reading and writing commands of the steps (3A) and (3B). In this case, in place of the NAS 101, the microprogram 111 reads data from the primary volume 301, and writes the data in the differential data storage area 303 of the differential volume 302.

Alternatively, the NAS 101 may issue a COPY & WRITE command in place of the reading command of the step (3A) and the two writing commands of the steps (3B) and (4). In this case, in place of the NAS 101, the microprogram 111 reads the data from the primary volume 301, writes the data in the differential storage area 303 of the differential volume 302, and writes information for identifying the writing destination in the snapshot management table 304.

Alternatively, the NAS 101 may issue a COPY & WRITE & WRITE command in place of the reading command of the step (3A) and the three writing commands of the steps (3B), (4), and (5). In this case, in place of the NAS 101, the microprogram 111 reads the data from the primary volume 301, writes the data in the differential storage area 303 of the differential volume 302, writes information for identifying the writing destination in the snapshot management table 304, and writes target data of a writing request in the target block.

As described above, the fifth embodiment of this invention is designed to apply the invention when a group of a series of commands is integrated in one command. Thus, copy invalidation equivalent to the step (3) of FIG. 4 is executed by the microprogram 111.

First, a case where the NAS 101 issues the COPY command will be described.

Figure 22:
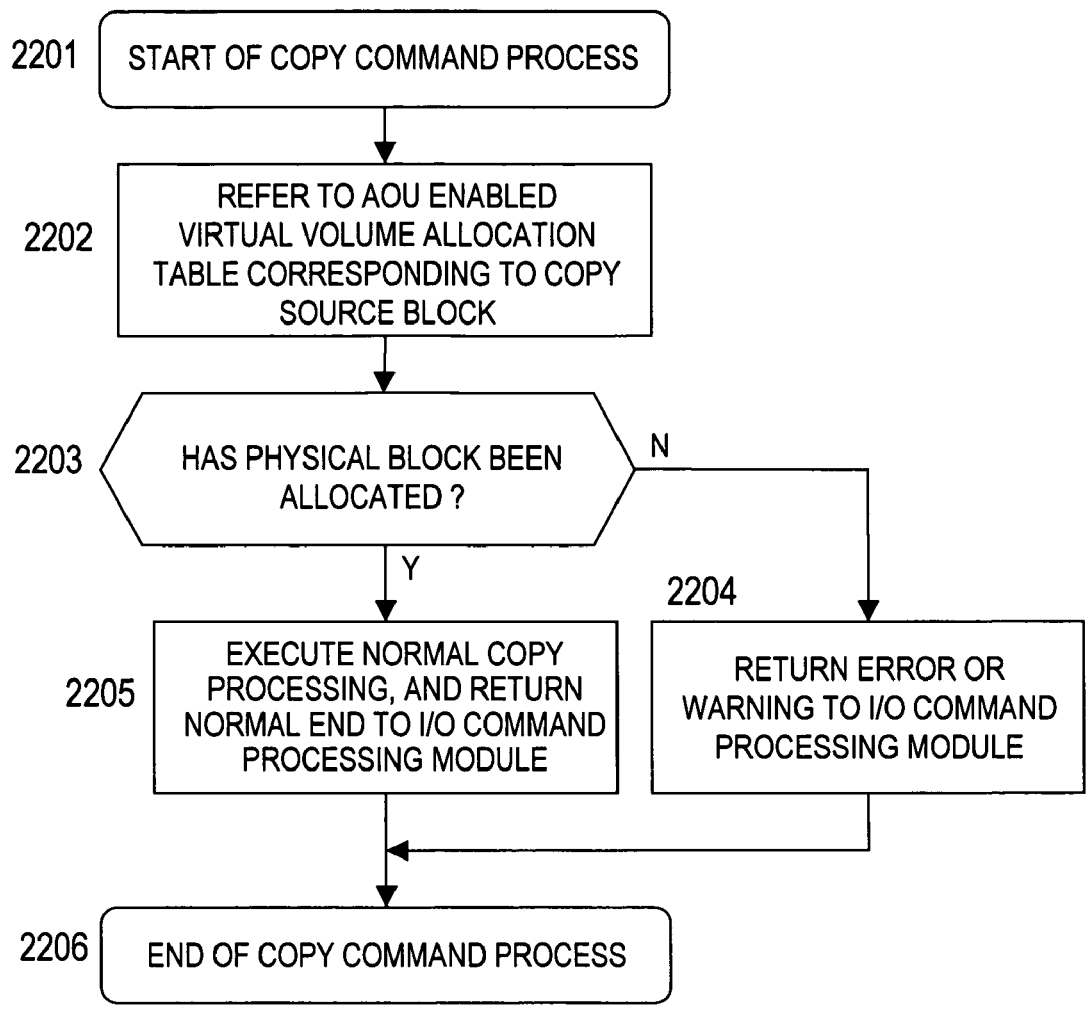
FIG. 22 is a flowchart showing a COPY command process executed by an AOU enabled virtual volume management processing module according to a fifth embodiment of this invention.

FIG. 22 is a flowchart showing a COPY command process executed by the AOU enabled virtual volume management processing module 114 according to the fifth embodiment of this invention.

Upon reception of the COPY command from the NAS 101, the AOU enabled virtual volume management processing module 114 starts the COPY command process (step 2201).

Next, the AOU enabled virtual volume management processing module 114 refers to the AOU enabled virtual volume allocation table 115 corresponding to a source block (step 2202). The source block is a writing target block designated by an I/O command in the primary volume 301.

Then, the AOU enabled virtual volume management processing module 114 judges whether a physical block has been allocated to the source block or not (step 2203).

If it is judged in the step 2203 that a physical block has been allocated, the AOU enabled virtual volume management processing module 114 executes copying processing and return a normal end as a response to the I/O command processing module 112 (step 2205). The copying process executed in the step 2205 is similar to that executed by the snapshot processing module 104 in the steps 1005 and 1006 of FIG. 10. In other words, the AOU enabled virtual volume management processing module 114 reads data from the copy source block, and writes the data in the differential data storage area 303 of the differential volume 302.

On the other hand, if it is judged in the step 2203 that no physical block has been allocated, the AOU enabled virtual volume management processing module 114 returns an error or warning as a response to the I/O command processing module 112 without executing the copying process of the step 2205 (step 2204). The error or the warning returned in this case contains information indicating that the requested copying process has not been executed.

After execution of the step 2204 or 2205, the AOU enabled virtual volume management processing module 114 finishes the COPY command process (step 2206).

The COPY command process can be applied not only to the COPY command issued during a COW process but also all COPY commands issued to copy data between the two volumes 300. Besides, the COPY command process can be applied even when data is copied between the two blocks in the same volume 300 as shown in FIG. 4.

Next, a case where the NAS 101 issues the COPY & WRITE command will be described.

FIG. 23 is an explanatory diagram showing an example of a format of a COPY & WRITE command issued targeting an AOU disabled virtual volume according to the fifth embodiment of this invention.

As described above, the microprogram 111 that has received the COPY & WRITE command from the NAS 101 reads data from a block of the primary volume 301. This reading target is referred to as a "copy source" in a description for FIG. 23.

The microprogram 111 writes the read data in the differential storage area 303 of the differential volume 302. This writing target is referred to as a "copy destination" in a description for FIG. 23.

The microprogram 111 writes information for identifying the copy destination in the snapshot management table 304. This writing target is referred to as a "writing destination" in a description for FIG. 23.

The COPY & WRITE command contains pieces of information for identifying the copy source, the copy destination, and the writing destination.

The COPY & WRITE command includes fields of a COPY & WRITE command 2301, a copy source disk drive 2302, a copy source block address 2303, the number of blocks 2304 to be copied, a copy destination disk drive 2305, a copy destination block address 2306, a writing destination disk drive 2307, a writing destination block address 2308, the number of blocks 2309 to be written, and a write data holding memory address 2310 from the head.

The COPY & WRITE command 2301 is an identifier used for identifying a command. In other words, COPY & WRITE command 2301 includes information indicating that the command is a COPY & WRITE command.

The copy source disk drive 2302 is an identifier of a disk drive 159 which stores a copy source block.

The copy source block address 2303 is a block address for identifying the copy source block. In the case of a plurality of continuous copy source blocks, the copy source block address 2303 is a block address for identifying a first of the copy source blocks.

The number of blocks 2304 to be copied is the number of copying target blocks. In other words, the number of blocks 2304 to be copied indicates an amount of data to be copied.

The copy destination disk drive 2305 is an identifier of a disk drive 159 which stores a copy destination block.

The copy destination block address 2306 is a block address for identifying the copy destination block. In the case of a plurality of continuous copy destination blocks, the copy destination block address 2306 is a block address for identifying a first of the copy destination blocks.

The writing destination disk drive 2307 is an identifier of a disk drive 159 which stores a writing destination block.

The writing destination block address 2308 is a block address for identifying a first of writing destination blocks.

The number of blocks 2309 to be written is the number of writing target blocks.

The write data holding memory address 2310 is an address of a NAS main memory 153 in which writing target data has been stored. By designating these data to issue commands, the COPY & WRITE command is executed.

Figure 24:
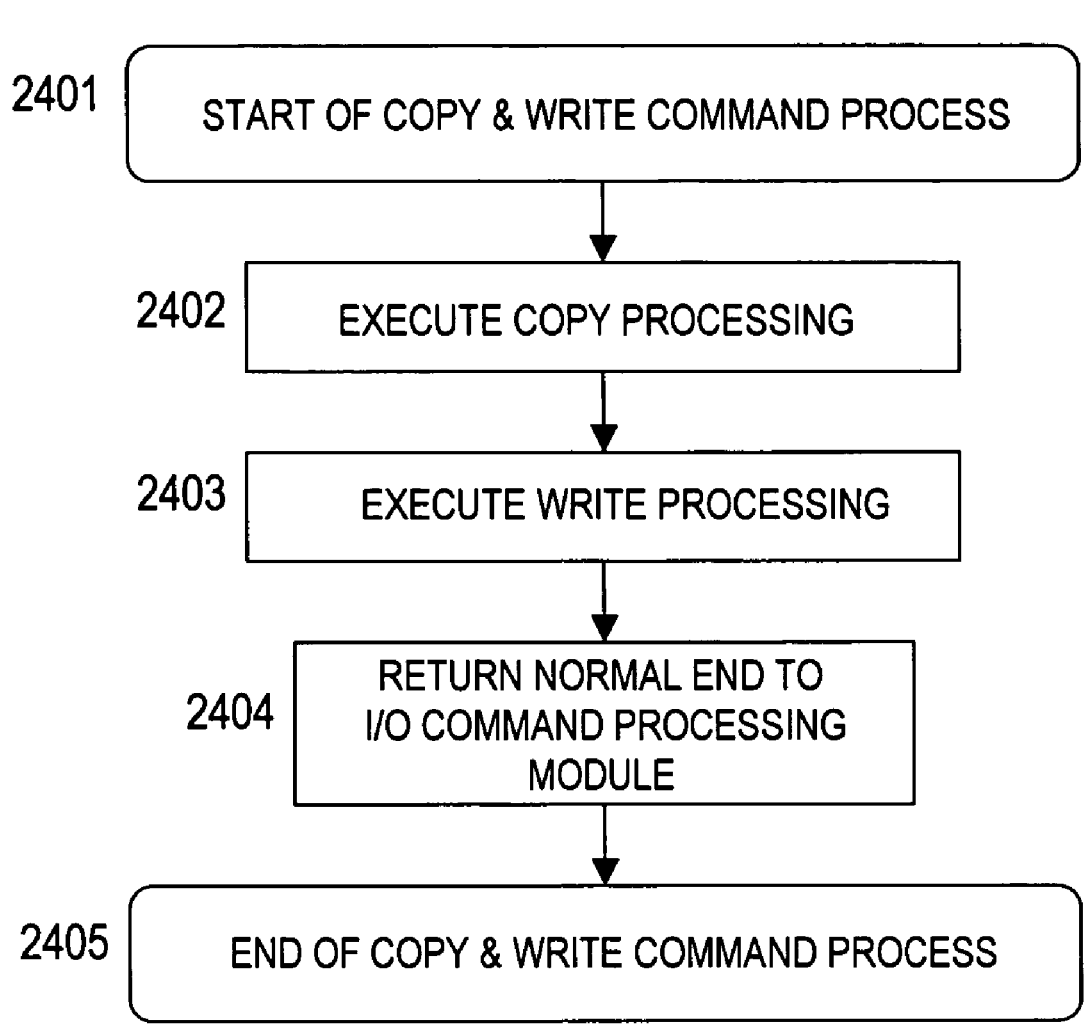
FIG. 24 is a flowchart when the COPY & WRITE command is executed by an AOU disabled virtual volume management processing module according to the fifth embodiment of this invention.

FIG. 24 is a flowchart when the COPY & WRITE command is executed by the AOU disabled virtual volume management processing module 113 according to the fifth embodiment of this invention.

Upon starting the COPY & WRITE command (step 2401), the AOU disabled virtual volume management processing module 113 executes a COPY process based on pieces of information of the fields 2302 to 2306 of the COPY & WRITE command (step 2402). To be specific, the process of reading data from the primary volume 301 and writing the data in the differential volume 302 is executed.

Next, the AOU disabled virtual volume management processing module 113 executes a WRITE process based on pieces of information of the fields 2307 to 2310 of the COPY & WRITE command (step 2403). To be specific, information indicating a copy destination is written in the snapshot management table 304.

Next, the AOU disabled virtual volume management processing module 113 returns a normal end as a response to the I/O command processing module 112 (step 2404) to finish the COPY & WRITE command (step 2405).

FIG. 25 is an explanatory diagram showing an example of a format of the COPY & WRITE command issued targeting an AOU enabled virtual volume according to the fifth embodiment of this invention.

Among fields constituting the COPY & WRITE command shown in FIG. 25, fields 2501 to 2509 are similar to the fields 2301 to 2309 shown in FIG. 23. Thus, description thereof will be omitted.

In the COPY & WRITE command of FIG. 25, there are two fields prepared to designate write data holding memory addresses, i.e., a write first data holding memory address 2510 and a write second data holding memory address 2511.

The write first data holding memory address 2510 is an address of the NAS main memory 153 which stores data to be written (i.e., WRITE data 1) in the snapshot management table 304 when a physical block has been allocated to the copy source block. The WRITE data 1 contains information indicating the copy destination.

The write second data holding memory address 2511 is an address of the NAS main memory 153 which stores data to be written (i.e., WRITE data 2) in the snapshot management table 304 when no physical block has been allocated to the copy source block. The WRITE data 2 contains information indicating the dummy data block.

A format of FIG. 25 may be applied to an AOU disabled volume. In this case, write data shown in a field 2511 is ignored.

Figure 26:
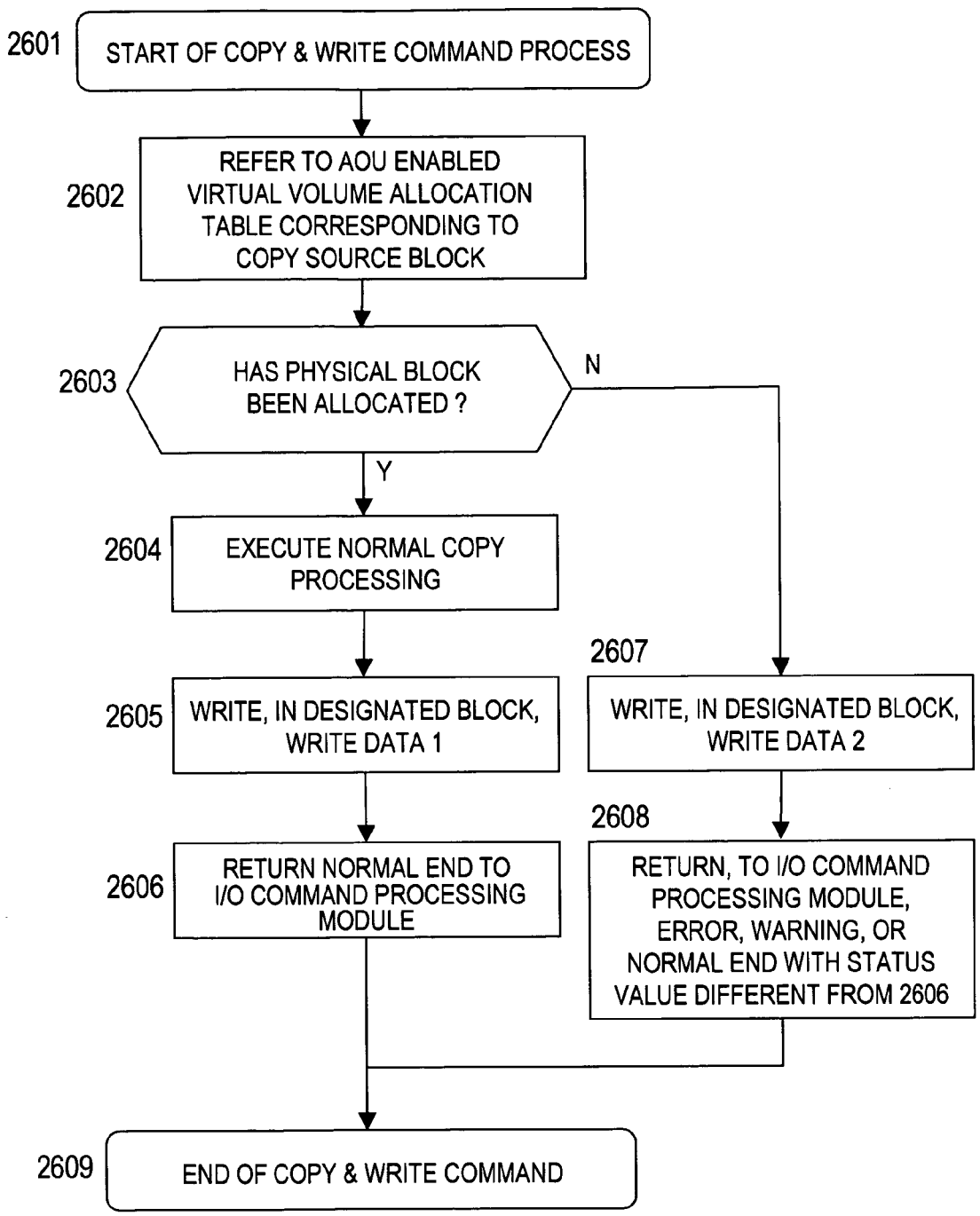
FIG. 26 is a flowchart when the COPY & WRITE command is executed by the AOU enabled virtual volume management processing module according to the fifth embodiment of this invention.

FIG. 26 is a flowchart when the COPY & WRITE command is executed by the AOU enabled virtual volume management processing module 114 according to the fifth embodiment of this invention.

Upon reception of the COPY command from the NAS 101, the AOU enabled virtual volume management processing module 114 starts a COPY & WRITE command process (step 2601).

Steps 2602 and 2603 are similar to the steps 2202 and 2203 of FIG. 22, and thus description thereof will be omitted.

If it is judged in the step 2603 that a physical block has been allocated, the AOU enabled virtual volume management processing module 114 executes a copying process (step 2604).

Next, the AOU enabled virtual volume management processing module 114 writes WRITE data 1 based on the write first data holding memory address 2510 in a block designated by the writing destination disk drive 2507 and the writing destination block address 2508 (step 2605). When this command is used in a snapshot function, the WRITE data 1 is data to be written in the snapshot management table 304. In other words, the WRITE data 1 contains information indicating a correlation between the copy destination block of the differential data storage area 303 and the copy source block of the primary volume 301.

The AOU enabled virtual volume management processing module 114 returns a normal end as a response to the I/O command processing module 112 (step 2606) to finish the command process (step 2609).

On the other hand, if it is judged in the step 2603 that no physical block has been allocated, the AOU enabled virtual volume management processing module 114 writes WRITE data 2 based on a write second data holding memory address 2511 in a block designated by the writing destination disk drive 2507 and the writing destination block address 2508 (step 2607). When this command is used in the snapshot function, the WRITE data 2 is data to be written in the snapshot management table. In other words, the WRITE data 2 contains information indicating a correlation between a dummy data block or a dummy block number and the copy source block.

Next, the AOU enabled virtual volume management processing module 114 returns an error, warning, or a normal end as a response to the I/O command processing module 112 (step 2608). In this case, a status value different from that of the step 2606 is returned to the I/O command processing module 112. Thus, the command process is completed (step 2609).

FIG. 27 is an explanatory diagram showing an example of a format of a COPY & WRITE & WRITE command issued targeting an AOU disabled virtual volume according to the fifth embodiment of this invention.

As described above, the microprogram 111 that has received the COPY & WRITE & WRITE command from the NAS 101 reads data from a block of the primary volume 301. This reading target is referred to as a "copy source" in a description for FIG. 27.

The microprogram 111 writes the read data in the differential storage area 303 of the differential volume 302. This writing target is referred to as a "copy destination" in a description for FIG. 27.

The microprogram 111 writes information for identifying the copy destination in the snapshot management table 304. This writing target is referred to as a "first writing destination" in a description for FIG. 27. Further, the process of this writing is referred to as a "first writing process".

Further, the microprogram 111 writes data to be written in the primary volume 301 therein. This writing target is referred to as a "second writing destination" in FIG. 27. This writing process is referred to as a "second writing process".

The COPY & WRITE & WRITE command contains pieces of information for identifying the copy source, the copy destination, and the first and second writing destinations.

A COPY & WRITE & WRITE command 2701 is an identifier indicating that the command is a COPY & WRITE & WRITE command.

Fields of a copy source disk drive 2702 to a copy destination block address 2706 are similar to the copy source disk drive 2302 to a copy destination block address 2306 of the COPY & WRITE command shown in FIG. 23, and thus description thereof will be omitted.

The first writing destination disk drive 2707 is an identifier of a disk drive 159 which stores a first writing destination block.

The first writing destination block address 2708 is a block address for identifying a first of the first writing destination blocks.

The number of the first blocks 2709 to be written is the number of the first writing target blocks.

The first write data holding memory address 2710 is an address of a memory of the NAS 101 in which the first writing target data has been stored.

The second writing destination disk drive 2711 is an identifier of a disk drive 159 which stores a second writing destination block. The second writing destination block address 2712 is a block address for identifying a first of second writing destination blocks. The number of second blocks 2713 to be written is the number of second writing target blocks. The second write data holding memory address 2714 is an address of a memory of the NAS 101 which stores second writing target data. By designating these data to issue commands, the COPY & WRITE & WRITE command is executed.

Figure 28:
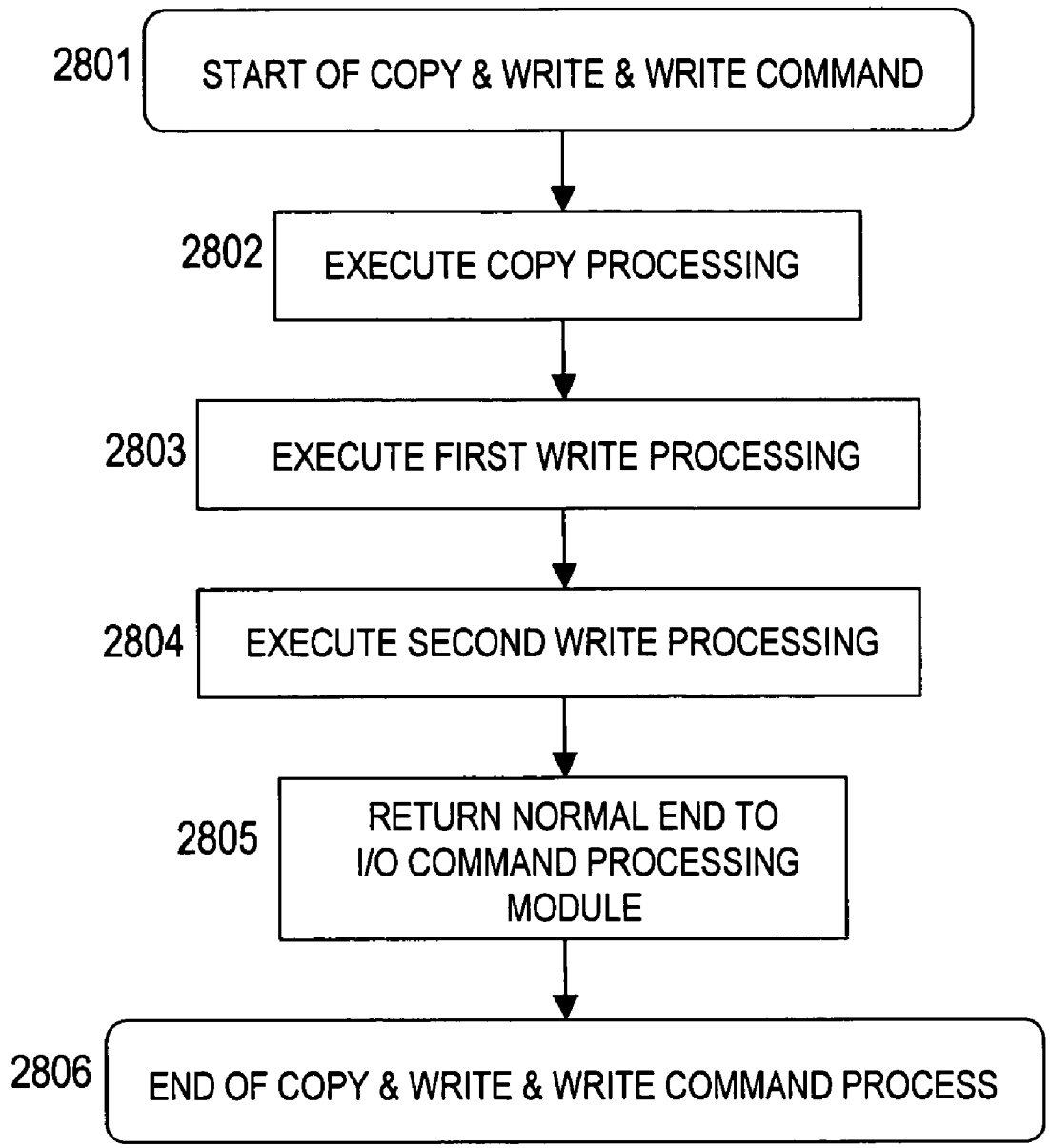
FIG. 28 is a flowchart when the COPY & WRITE & WRITE command is executed by the AOU disabled virtual volume management processing module according to the fifth embodiment of this invention.

FIG. 28 is a flowchart when the COPY & WRITE & WRITE command is executed by the AOU disabled virtual volume management processing module 113 according to the fifth embodiment of this invention.

Upon starting the COPY & WRITE & WRITE command (step 2801), the AOU disabled virtual volume management processing module 113 executes a COPY process based on pieces of information of the fields 2702 to 2706 of the COPY & WRITE & WRITE command (2802). To be specific, the process of reading data from the primary volume 301 and writing the data in the differential volume 302 is executed.

Next, the AOU disabled virtual volume management processing module 113 executes a first writing (WRITE) process based on pieces of information of the fields 2707 to 2710 of the COPY & WRITE & WRITE command (step 2803). To be specific, information indicating a copy destination is written in the snapshot management table 304.

Next, the AOU disabled virtual volume management processing module 113 executes a second writing (WRITE) process based on pieces of information of the fields 2711 to 2714 of the COPY & WRITE & WRITE command (step 2804). To be specific, the data requested to be written in the primary volume 301 by the NAS 101 is written therein.

Next, the AOU disabled virtual volume management processing module 113 returns a normal end as a response to the I/O command processing module 112 (step 2805) to finish the COPY & WRITE & WRITE command (step 2806).

FIG. 29 is an explanatory diagram showing an example of a format of the COPY & WRITE & WRITE command issued targeting an AOU enabled virtual volume according to the fifth embodiment of this invention.

Among fields constituting the COPY & WRITE & WRITE command shown in FIG. 29, fields 2901 to 2909 are similar to the fields 2701 to 2709 shown in FIG. 27. Fields 2912 to 2915 are similar to the fields 2711 to 2714. Thus, description of these fields will be omitted.

In the COPY & WRITE & WRITE command of FIG. 29, there are two fields prepared to designate first write data holding memory addresses, i.e., a first write first data holding memory address 2910 and a first write second data holding memory address 2911. These fields 2910 and 2911 are similar to the fields 2510 and 2511 of FIG. 25, and thus description thereof will be omitted.

The format of FIG. 29 may be applied to an AOU disabled volume by arranging the first write second data holding memory address 2911 at the last of the command or the like. In this case, write data shown in the field 2911 is ignored.

Figure 30:
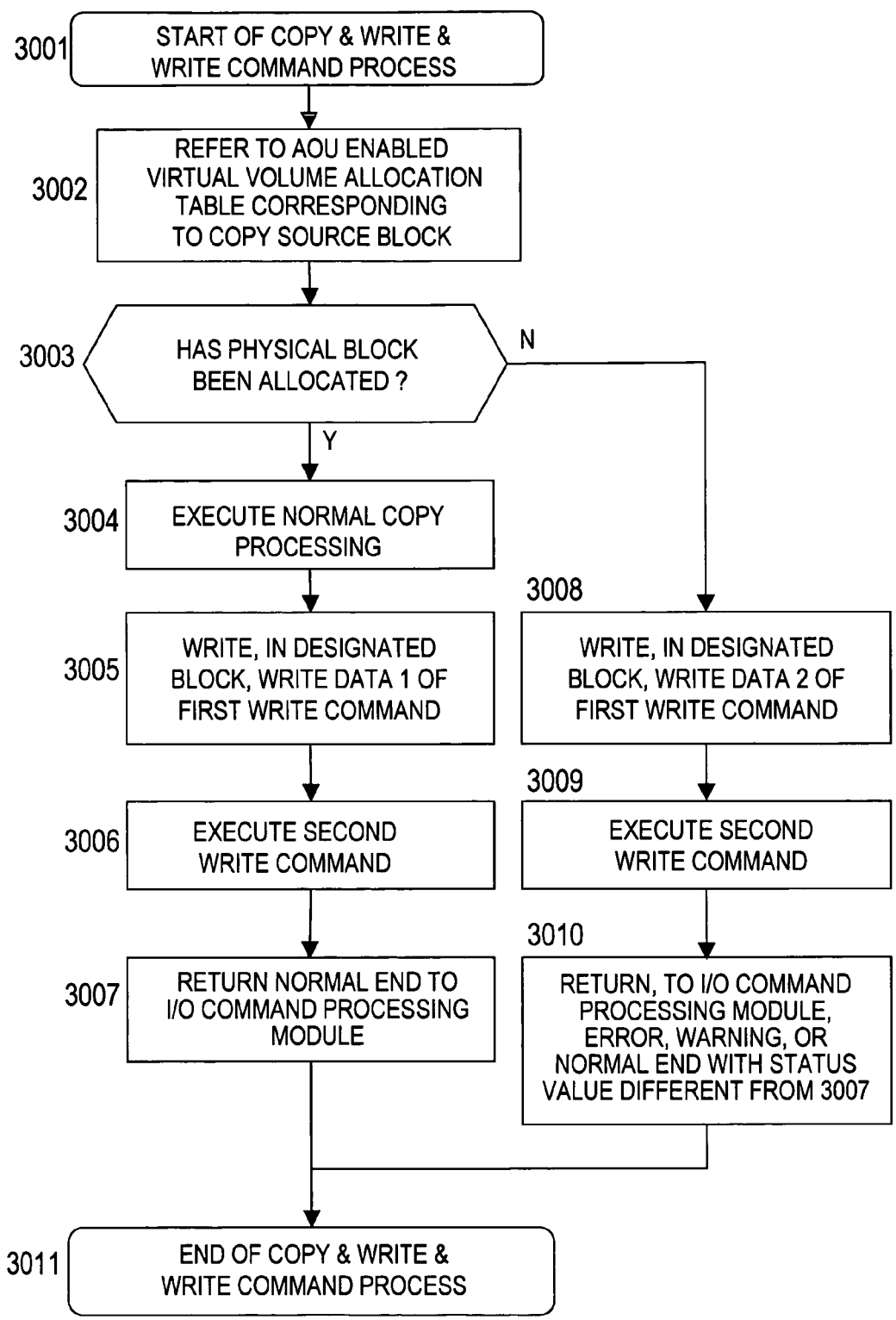
FIG. 30 is a flowchart when the COPY & WRITE & WRITE command is executed by the AOU enabled virtual volume management processing module according to the fifth embodiment of this invention.

FIG. 30 is a flowchart when the COPY & WRITE & WRITE command is executed by the AOU enabled virtual volume management processing module 114 according to the fifth embodiment of this invention.

Steps 3001 to 3004 of FIG. 30 are similar to the steps 2601 to 2604 of FIG. 26, and thus description thereof will be omitted.

After execution of the step 3004, the AOU enabled virtual volume management processing module 114 writes WRITE data 1 which is a target of a first WRITE command in a block designated by the first writing destination disk drive 2907 and the first writing destination block address 2908 based on information of the first write first data holding memory address 2910 (step 3005).

Next, the AOU enabled virtual volume management processing module 114 executes a second writing process (second WRITE command) (step 3006). As a result, data requested to be written in the primary volume 301 by the NAS 101 (i.e., writing request target data issued from the NAS client to the NAS 101) is written in the primary volume 301.

Next, the AOU enabled virtual volume management processing module 114 returns a normal end as a response to the I/O command processing module 112 (step 3007) to finish the command process (step 3011).

On the other hand, if it is judged in the step 3003 that no physical block has been allocated, the AOU enabled virtual volume management processing module 114 writes WRITE data 2 which is a target of a first WRITE command in a designated block based on information of the first write second data holding memory address 2911 (step 3008). This writing destination block is designated by the writing destination disk drive 2507 and the writing destination block address 2508.

Next, the AOU enabled virtual volume management processing module 114 executes a second WRITE command as in the case of the step 3006 (step 3009).

Next, the AOU enabled virtual volume management processing module 114 returns an error, warning, or a normal end as a response to the I/O command processing module 112 (step 3010). In this case, a status value different from that of the step 3007 is returned to the I/O command processing module 112. Thus, the command process is completed (step 3011).

According to the fifth embodiment of this invention, when the differential snapshot is executed, the NAS 101 issues a plurality of commands to be issued to the storage device 101 by integrating them in one command. The microprogram 111 of the storage device 101 sequentially executes a plurality of processes according to one command. As a result, a data transfer amount between the NAS 101 and the storage device 110 is reduced to improve performance. In this case, when there is no physical block allocated to the block of the data writing target primary volume, it is not necessary to save the data. Thus, the microprogram 111 omits copying for unnecessary saving. Hence, it is possible to improve data processing performance.

The first to fifth embodiments can be widely applied to the storage system.

What is claimed is:

1. A storage system coupled to a network, comprising:
an interface coupled to the network;
a processor coupled to the interface;
a first memory coupled to the processor; and
a disk drive for storing data whose physical storage area is allocated to at least one of a plurality of blocks included in one or more volumes;
wherein the plurality of blocks include a first block included in an operation volume, a second block included in a differential volume;
wherein the processor performs a snapshot process to judge whether the physical storage area has been allocated or not to the first block when the interface receives a data writing request targeting the first block through the network;
wherein when the physical area is judged to have been allocated, the processor copies data stored in the first block to the second block before writing data to be written by the writing request in the first block; and
wherein when the physical storage area is judged not to have been allocated, the processor
  issues a physical block allocation request to the first block, and
  writes information on which indicates snapshot in the first block is dummy data in snapshot management information and writes the data in the first block without copying the data stored in the first block to the second block.

2. The storage system according to claim 1, further comprising:
a computer including the interface, the processor, and the first memory; and
a storage device including the disk drive, a disk controller for controlling the disk drive, and a second memory coupled to the disk controller, wherein:

the second memory holds an allocation table containing information indicating a correlation between each of the blocks and the physical storage area;
the one or more volumes contain a primary volume including the first block and a differential volume including the second block;
the processor creates allocation information containing information indicating whether the physical storage area has been allocated or not to each of the blocks based on the allocation table; and
the processor judges whether the physical storage area has been allocated or not to the first block based on the allocation information.

3. The storage system according to claim 1, further comprising:
a computer including the interface, the processor, and the first memory; and
a storage device including the disk drive, a disk controller for controlling the disk drive, and a second memory coupled to the disk controller, wherein:
the second memory holds an allocation table containing information indicating a correlation between each of the blocks and the physical storage area;
the one or more volumes contain a primary volume including the first block, and a differential volume including the second block;
the processor issues a reading request targeting the first block to the storage device;
each of the blocks is identified by a block address;
the block address includes a first block address for identifying the first block, and a second block address to be continuous from the first block address;
the disk controller judges whether the physical storage area has been allocated or not to the first block based on the allocation table;
the disk controller transmits information indicating whether the physical storage area has been allocated or not to a block identified by the second block address to the computer when the physical storage area is judged not to have been allocated to the first block; and
the processor judges whether the physical storage area has been allocated or not to the block identified by the second block address based on the information transmitted from the disk controller when a writing request targeting the block identified by the second block address is received.

4. The storage system according to claim 1, wherein:
the first memory holds an application program executed by the processor, and policy information;
the processor selects one of block to which the physical storage area has been allocated and the block to which the physical storage area has not been allocated among the blocks not used by the application program based on a value of the policy information; and
the processor allows the application program to use the selected block.

5. The storage system according to claim 4, wherein:
the processor receives a changing request of the policy information; and
the processor changes the value of the policy information based on the received changing request.

6. A storage device coupled to a computer,
the computer comprising:
a processor; and
a first memory coupled to the processor,
the storage device comprising:

a disk drive for storing data whose physical storage area is allocated to at least one of a plurality of blocks included in one or more volumes;

a disk controller for controlling the disk drive;

a second memory coupled to the disk controller; and wherein the plurality of blocks included in an operation volume, a second block included in a differential volume;

a physical storage area of the disk drive is allocated to at least one of the plurality of blocks;

the second memory holds an allocation table containing information indicating a correlation between each of the blocks and the physical storage area;

wherein the disk controller, upon reception of a predetermined command from the computer, performs a snap process to judge whether the physical storage area has been allocated or not to the first block designated by the command based on the allocation table;

wherein when the physical area is judged to have been allocated, the disk controller copies data stored in the designated first block to the second block designated by the command before writing data to be written by the predetermined command; and wherein when the physical storage area is judged not to have been allocated to the designated first block, the disk controller
  issues a physical block allocation request to the designated first block, and
  writes information on which indicates snapshot in the first block is dummy data in snapshot management information and writes the data in the first block without copying the data stored in the first block to the second block.

7. The storage device according to claim 6, wherein:
  the one or more volumes contain a primary volume including a block in which data received from the computer is written, and a differential volume to which data is copied, the data having been stored in the block before the data received from the computer is written;
  the first block is included in the primary volume; and
  the second block is included in the differential volume.

8. The storage device according to claim 7, wherein when the physical storage area is judged to have been allocated to the designated first block, the disk controller that has received the command further writes information for identifying a copying destination of the data in a position designated by the command of the differential volume.

9. The storage device according to claim 8, wherein when the physical storage area is not judged to have been allocated to the designated first block, the disk controller that has received the command further writes information for indicating a predetermined position in the differential volume in a position designated by the command of the differential volume.

10. The storage device according to claim 8, wherein the disk controller that has received the command further writes data to be written by a writing request designated by the command in the designated first block.

11. A controlling method for a storage system coupled to a network,
  wherein the storage system comprises, an interface coupled to the network, a processor coupled to the interface, a first memory coupled to the processor, a disk drive for storing data whose physical storage area is allocated to at least one of a plurality of blocks included in one or more volumes, and one or more volumes, wherein the plurality of blocks include a first block included in an operation volume, a second block included in a differential volume, and the method comprising:

performing a snapshot process to judge, by the processor, whether the physical storage area has been allocated or not to the first block when the interface receives a data writing request targeting the first block through the network;

when the physical area is judged to have been allocated copying, by the processor, data stored in the first block to the second block before writing data to be written by the writing request in the first block; and when the physical storage area is judged not to have been allocated,
  issuing a physical block allocation request to the first block,
writes information on which indicates snapshot in the first block is dummy data in snapshot management information and writes the data in the first block without copying the data stored in the first block to the second block,
  writing, by the processor, the data to be written by the request in the first block without copying the data stored in the first block to the second block.

12. The method according to claim 11,
wherein the storage system further comprises:
  a computer including the interface, the processor, and the first memory; and
  a storage device including the disk drive, a disk controller for controlling the disk drive, and a second memory coupled to the disk controller,
wherein the second memory holds an allocation table containing information indicating a correlation between each of the blocks and the physical storage area; and
wherein the one or more volumes contain a primary volume including the first block and a differential volume including the second block,
the method further comprising:
creating, by the processor, allocation information containing information indicating whether the physical storage area has been allocated or not to each of the blocks based on the allocation table; and
judging, by the processor, whether the physical storage area has been allocated or not to the first block based on the allocation information.

13. The method according to claim 11,
wherein the storage system further comprises:
  a computer including the interface, the processor, and the first memory; and
  a storage device including the disk drive, a disk controller for controlling the disk drive, and a second memory coupled to the disk controller,
wherein the second memory holds an allocation table containing information indicating a correlation between each of the blocks and the physical storage area,
wherein the one or more volumes contain a primary volume including the first block, and a differential volume including the second block,
wherein the processor issues a reading request targeting the first block to the storage device,
wherein each of the blocks is identified by a block address, and
wherein the block address includes a first block address for identifying the first block, and a second block address to be continuous from the first block address,
the method further comprising:

judging, by the disk controller, whether the physical storage area has been allocated or not to the first block based on the allocation table;

transmitting, by the disk controller, information indicating whether the physical storage area has been allocated or not to a block identified by the second block address to the computer when the physical storage area is judged not to have been allocated to the first block; and judging, by the processor, whether the physical storage area has been allocated or not to the block identified by the second block address based on the information transmitted from the disk controller when a writing request targeting the block identified by the second block address is received.

14. The method according to claim 11, wherein the first memory holds an application program executed by the processor, and policy information, the method further comprising:

selecting, by the processor, one of the block to which the physical storage area has been allocated and the block to which the physical storage area has not been allocated among the blocks not used by the application program based on a value of the policy information; and allowing, by the processor, the application program to use the selected block.

15. The method according to claim 14, further comprising:

receiving, by the processor, a changing request of the policy information; and changing, by the processor, the value of the policy information based on the received changing request.

16. A method for a storage device coupled to a computer, wherein the computer comprises a processor and a first memory coupled to the processor, wherein the storage device comprises a disk drive for storing data whose physical storage area is allocated to at least one of a plurality of blocks included in one or more volumes, a disk controller for controlling the disk drive, a second memory coupled to the disk controller and one or more volumes, wherein a physical storage area of the disk drive is allocated to at least one of the plurality of blocks, and wherein the second memory holds an allocation table containing information indicating a correlation between each of the blocks and the physical storage area, the method further comprising:

receiving, by the disk controller, a predetermined command from the computer;

performing a snapshot process to judge, by the disk controller, whether the physical storage area has been allocated or not to the first block designated by the predetermined command based on the allocation table;

when the physical area is judged to have been allocated, copying, by the disk controller, data stored in the designated first block to the second block designated by the command before writing data to be written by the predetermined command; and when the physical storage area is judged not to have been allocated to the designated first block, issuing a physical block allocation request to the first block, and writes information on which indicates snapshot in the first block is dummy data in snapshot management information and writes the data in the first block without copying the data stored in the first block to the second block.

17. The method according to claim 16, wherein:

the one or more volumes contain a primary volume including a block in which data received from the computer is written, and a differential volume to which data is copied, the data having been stored in the block before the data received from the computer is written;

the first block is included in the primary volume; and the second block is included in the differential volume.

18. The method according to claim 17 further comprising writing, by the disk controller that has received the command, information for identifying a copying destination of the data in a position designated by the command of the differential volume when the physical storage area is judged to have been allocated to the designated first block.

19. The method according to claim 18 further comprising writing, by the disk controller that has received the command, information for indicating a predetermined position in the differential volume in a position designated by the command of the differential volume when the physical storage area is not judged to have been allocated to the designated first block.

20. The method according to claim 18 further comprising writing, by the disk controller that has received the command, data to be written by a writing request designated by the command in the designated first block.

* * * * *